US012806117B2

(12) United States Patent
Szpak et al.

(10) Patent No.: US 12,806,117 B2
(45) Date of Patent: Nov. 24, 2026

(54) LIGHT THERAPY FOR SPA

(71) Applicant: Sundance Spas, Inc., Chino, CA (US)

(72) Inventors: James Szpak, Cleveland Heights, OH (US); William Eugene Rabbitt, Cleveland, OH (US); Sergey Makarov, Solon, OH (US); Larry R. Ovalle, Glendora, CA (US); Erica Aloisia Moir, Santa Ana, CA (US)

(73) Assignee: Sundance Spas, Inc. the, Chino, CA (US)

( * ) Notice: Subject to any disclaimer, the term of this patent is extended or adjusted under 35 U.S.C. 154(b) by 0 days.

(21) Appl. No.: 18/954,200

(22) Filed: Nov. 20, 2024

(65) Prior Publication Data

US 2025/0073122 A1 Mar. 6, 2025

Related U.S. Application Data

(63) Continuation of application No. 18/177,660, filed on Mar. 2, 2023.

(Continued)

(51) Int. Cl.
*A61H 33/00* (2006.01)

(52) U.S. Cl.
CPC . *A61H 33/6005* (2013.01); *A61H 2033/0083* (2013.01); *A61H 2201/10* (2013.01);

(Continued)

(58) Field of Classification Search
CPC ................ A61H 33/00; A61H 33/6005; A61H 2033/0083; A61H 2201/10;

(Continued)

(56) References Cited

U.S. PATENT DOCUMENTS 4,497,313 A 2/1985 Kurosawa
5,044,357 A * 9/1991 Johns .................. A61H 35/006 601/166

(Continued)

FOREIGN PATENT DOCUMENTS

BR MU9102997 U2 * 10/2013
CN 110881881 A * 3/2020

(Continued)

OTHER PUBLICATIONS

English Translation of "BR MU9102997 U2", Oct. 15, 2013 (Year: 2013).*

(Continued)

*Primary Examiner* — Douglas Y Sul
(74) *Attorney, Agent, or Firm* — Knobbe, Martens, Olson & Bear, LLP

(57) ABSTRACT

A system for water immersion may include a shell comprising an interior wall defining a receptacle sized and shaped to hold water, the shell comprising a seat between a floor of the shell and an upper edge of the shell. The spa may include a therapeutic light assembly positioned in the interior wall of the shell and between the seat and the upper edge of the shell, the therapeutic light assembly comprising: a lens that allows the transmission of infrared light, a housing recessed in the interior wall of the shell; and at least one infrared LED positioned between the lens and the housing, wherein in use, the therapeutic light assembly is positioned below the water line during normal use.

22 Claims, 15 Drawing Sheets

Related U.S. Application Data

(60) Provisional application No. 63/368,345, filed on Jul. 13, 2022, provisional application No. 63/268,915, filed on Mar. 4, 2022.

(52) U.S. Cl.
CPC ................ *A61H 2201/5012* (2013.01); *A61H 2201/5038* (2013.01)

(58) Field of Classification Search
CPC .... A61H 2201/5012; A61H 2201/5038; A61H 33/02; A61H 33/6021; A61H 33/6063; A61H 2201/0188; A61M 2205/052; A61N 5/06; A61N 5/0613; A61N 5/0616; A61N 5/0625; A61N 2005/0643; A61N 5/0614; F21Y 2015/18; F21S 10/002; F21V 31/00
USPC .......................... 601/17; 607/88; 362/96, 101
See application file for complete search history.

(56) References Cited

U.S. PATENT DOCUMENTS

| | | | | |
|---|---|---|---|---|
| 5,255,399 | A | 10/1993 | Park | |
| 6,360,380 | B1 * | 3/2002 | Swart | E03C 1/24 4/584 |
| 6,418,573 | B1 | 7/2002 | Masuda | |
| 6,453,484 | B1 * | 9/2002 | Pinciaro | F16L 5/10 4/541.6 |
| 6,568,000 | B1 | 5/2003 | Kaufman et al. | |
| 6,602,275 | B1 * | 8/2003 | Sullivan | A61N 5/0616 607/90 |
| 7,204,602 | B2 * | 4/2007 | Archer | F21V 29/59 239/18 |
| 8,079,726 | B1 * | 12/2011 | Hui | E04H 4/148 362/101 |
| 8,220,082 | B2 * | 7/2012 | Chen | A61H 33/6026 4/541.4 |
| 8,676,044 | B2 | 3/2014 | O'Keeffe | |
| 9,808,644 | B2 * | 11/2017 | Daffer | A61N 5/0613 |
| 10,222,053 | B2 * | 3/2019 | Brunelle | F21V 33/004 |
| 10,265,539 | B2 | 4/2019 | Hatley | |
| 10,667,991 | B2 | 6/2020 | Taylor | |
| 10,737,112 | B2 | 8/2020 | Duncan et al. | |
| 11,045,373 | B2 | 6/2021 | Zack | |
| 2003/0147241 | A1 * | 8/2003 | Hildebrand | F21V 33/004 362/240 |
| 2004/0237179 | A1 * | 12/2004 | Kjonaas | A61H 33/063 4/254 |
| 2005/0172392 | A1 * | 8/2005 | Swart | A61H 33/026 4/541.5 |
| 2006/0002105 | A1 * | 1/2006 | Hinojosa, Jr. | A61H 33/027 362/101 |
| 2006/0218715 | A1 * | 10/2006 | Gardenier | A61H 33/0087 4/541.1 |
| 2007/0000043 | A1 | 1/2007 | Nakayama | |
| 2009/0180281 | A1 * | 7/2009 | Ahland, III | F21V 25/10 362/234 |
| 2010/0022941 | A1 * | 1/2010 | Pelkus | A61L 2/0011 604/20 |
| 2010/0176520 | A1 * | 7/2010 | Cunningham | A61H 33/02 261/121.1 |
| 2011/0267834 | A1 * | 11/2011 | Potucek | F21V 29/70 362/267 |
| 2012/0016274 | A1 * | 1/2012 | Howe | A61M 21/02 601/148 |
| 2014/0059759 | A1 | 3/2014 | DuHack | |
| 2017/0131693 | A1 * | 5/2017 | Shurtleff | A63B 23/03541 |
| 2017/0232268 | A1 * | 8/2017 | Hatley | A61N 5/0616 607/80 |
| 2018/0192829 | A1 * | 7/2018 | Manchiraju | A47K 3/003 |
| 2020/0100466 | A1 | 4/2020 | Kim et al. | |
| 2020/0147407 | A1 | 5/2020 | Efremkin | |
| 2021/0022566 | A1 | 1/2021 | Yoo et al. | |
| 2023/0132521 | A1 * | 5/2023 | Thibeault | G05G 1/10 4/541.3 |

FOREIGN PATENT DOCUMENTS

| | | | | | |
|---|---|---|---|---|---|
| CN | 212777125 | | 3/2021 | | |
| DE | 202022103648 | U1 | 7/2022 | | |
| KR | 200357725 | Y1 | 7/2004 | | |
| KR | 20060024064 | A | 3/2006 | | |
| KR | 100992528 | B1 | * | 11/2010 | A63B 21/008 |
| RU | 208701 | U1 | * | 12/2021 | |
| WO | WO 2012/068606 | A1 | 5/2012 | | |

OTHER PUBLICATIONS

English Translation of Zhu (CN 110881881 A), Mar. 17, 2020 (Year: 2020).*

English Translation of Pavlushov (RU 208701 U1), Dec. 30, 2021 (Year: 2021).*

Partial International Search Report issued on Jun. 26, 2023, in International Application No. PCT/US2023/063615, in 138 pages.

PCT Search Report and Written Opinion issued on Aug. 17, 2023, in International Application No. PCT/US2023/063615, in 21 pages.

* cited by examiner

LIGHT THERAPY FOR SPA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 18/177,660, filed Mar. 2, 2023, which claims priority to U.S. Provisional Patent Application No. 63/268,915, filed Mar. 4, 2022, and U.S. Provisional Patent Application No. 63/368,345, filed Jul. 13, 2022, all of which are hereby incorporated by reference in their entirety.

TECHNICAL FIELD

The present invention relates generally to a light therapy system for a spa.

BACKGROUND OF THE INVENTION

Spas can provide hydrotherapy, which promotes relaxation, pain relief, and improved sleep habits. These benefits can be enhanced by incorporating red and infrared light therapy. Infrared light therapy has been shown to promote healing and relieve pain. For example, infrared light therapy can be helpful in the treatment of a variety of conditions including skin lesions, tendinopathy, temporomandibular disorders, neck pain, and lower back pain. Red and near infrared light can penetrate the skin and reach soft tissue. The photons of the red and near infrared light can stimulate cellular level activity and healing. Several light wavelengths can be used during infrared light therapy. For example, light wavelengths ranging from or about 600 nm to or about 1200 nm have been used to effectively treat and manage pain and other conditions.

SUMMARY

Light therapy provides many health benefits including pain relief, increasing energy, improving sleep habits, providing relaxation, and skin rejuvenation, among others. Light therapy systems for spas can be expensive, inaccessible to some users, and harmful if not operated correctly.

Moreover, there are challenges to incorporating infrared light therapy into spas. If the infrared light is above the water line, prolonged infrared exposure can cause eye damage. If the infrared light is below the water line, it may be difficult to realize the full benefit of the therapy. Thus, there remains a need for a safe infrared light assembly that can provide therapeutic benefits in a spa setting.

The light therapy systems described herein are designed to overcome these challenges without sacrificing other benefits of light therapy systems. In several embodiments, the light therapy systems described herein have one or more of the following advantages:

- improve power consumption;
- improve treatment benefits by proving personalized therapy recommendations and/or pre-defined therapy settings;
- compatibility with different devices including spas, baths, and swimming pools;
- reduce harmful effects by providing safety measures including alarms and notifications.

One aspect of the present disclosure provides a system for water immersion. The system for water immersion includes a shell including an interior wall defining a receptacle sized and shaped to hold water. The shell can include a seat between a floor of the shell and an upper edge of the shell. A therapeutic light assembly can be positioned in the interior wall of the shell, for example between the seat and the upper edge of the shell. The therapeutic light assembly can include a lens that allows the transmission of infrared light, a housing recessed in the interior wall of the shell, and/or at least one infrared LED positioned between the lens and the housing. In use, the therapeutic light assembly can be positioned below the water line during normal use. Other locations for the therapeutic light assembly are imaginable, for example in the foot well or between the seat and the floor of the shell. The system for water immersion can be included in a spa, a pool, a bath, a whirlpool bath, a shower, and/or a sauna.

In some aspects, the therapeutic light assembly can include a plurality of infrared LEDs and/or a plurality of visible light LEDs. In some aspects, the plurality of visible light LEDs are red light LEDs. In some cases, the plurality of infrared LEDs and the plurality of visible LEDs can be arranged in alternating order. In some cases, the at least one infrared LED can be recessed in a bore in the housing. With respect to the housing, it can include a wall at least partially surrounding the bore to prevent infrared light from reaching the water line.

In some cases, the plurality of infrared LEDs have a 660 nm wavelength output. The plurality of visible light LEDs have an 850 nm wavelength output. The therapeutic light assembly may include the same number of infrared LEDs and visible light LEDs, for example twenty infrared LEDs and twenty visible light LEDs. In other arrangements, the therapeutic light assembly may include a different number of infrared LEDs and visible light LEDs. In some cases, the plurality of infrared LEDs can be positioned substantially along a plurality of concentric rings. The plurality of visible light LEDs can be positioned substantially along a plurality of concentric rings.

The system can include a software module or app configured to be installed on a remote device, the software module or app including non-transitory, computer-readable media storing computer-executable instructions that, when executed by the software module or app, cause the software module or app to: receive a user input; and communicate instructions to the system to adjust an intensity and/or duration of light emitted from the at least one infrared LED.

The system can include an alarm system which can emit an alarm indicative of an operational status of the therapeutic light assembly. In some aspects, the operational status of the therapeutic light assembly includes an active status, an inactive status, or an intensity level. With respect to the alarm, it can include an audible alarm, a visual alarm, or a combination thereof. In some cases, the therapeutic light assembly can include a reflector plate. The reflector plate can include a plurality of reflector hubs, each reflector hub surrounding one of the plurality of infrared LEDs.

Another aspect of the present disclosure provides a system for providing a therapeutic light treatment. The system can include a shell, one or more therapeutic light assemblies positioned in the interior wall of the shell, a memory that stores computer-executable instructions, and/or a processor in communication with the memory. With respect to the shell, it can include an interior wall defining a receptacle sized and shaped to hold water. The therapeutic light assembly can be positioned in the interior wall of the shell and include a plurality of infrared LEDs and/or a plurality of red LEDs. When executed by the processor, the computer-executable instructions can cause the processor to activate the plurality of infrared LEDs and/or the plurality of red LEDs and deactivate the plurality of infrared LEDs and/or the plurality of red LEDs after a pre-determined period of time. The system for water immersion can be included in a spa, a pool, a bath, a whirlpool bath, a shower, and/or a sauna.

In some aspects, the pre-determined period of time can be less than or equal to about 20 minutes. When executed by the processor, the computer-executable instructions can cause the processor to take one or more actions, including but not limited to: reduce a number of active infrared LEDs compared to a number of active red LEDs, reduce a number of active infrared LEDs compared to a number of active red LEDs, maintain the plurality of infrared LEDs and the plurality of red LEDs at a constant level of power output for the entirety of the pre-determined time period, gradually increase a power output of the plurality of infrared LEDs and the plurality of red LEDs over a period of at least 30 seconds, gradually increase a power output of the plurality of infrared LEDs and the plurality of red LEDs over a period of at least one minute, cycle the plurality of infrared LEDs and/or the plurality of red LEDs between a first power output and a second power output, process an indication of a selected therapy mode at the user interface and control a power output of the plurality of infrared LEDs and the plurality of red LEDs based on the selected therapy mode, and/or process an activation command at the user interface and only activate the plurality of LEDs and the plurality of red LEDs after processing the activation command. The system can also include a user interface which can receive a user input. In some cases, the user interface can be onboard the shell. In some aspects, the system includes one or more sensors. The one or more sensors can include a sensor to detect the presence of a user in the seat and/or a sensor to detect a level of water within the receptacle.

Another aspect of the present disclosure provides a system for water immersion. The system for water immersion can include a shell including an interior wall and an exterior wall and a light assembly. With respect to the shell, the interior wall can define a receptacle sized and shaped to hold water. The light assembly can be positioned in the interior wall of the shell and include a front end exposed to an interior of the shell and a rear end positioned in an interior portion of the shell between the interior wall and the exterior wall. The light assembly can include a bezel configured to be secured in an opening in the shell. The light assembly can include a lens that allows the transmission of light. The lens can be secured to the bezel or other trim components for appearance. The light assembly can include a housing mounted behind the lens. The light assembly can include at least one LED positioned between the lens and the housing. In some cases, the housing and the at least one LED can be removed from the light assembly from the rear end of the light assembly when the light assembly is positioned in the interior wall of the shell. The system for water immersion can be included in a spa, a swim spa, a pool, a bath, a whirlpool or experience bath, a shower, and/or a sauna. Although reference is made herein to therapeutic light assemblies, the structure of the light assemblies can be applied to any light assembly for serviceability of the light assembly. For example, components of the light assembly can be removed from the rear end of the light assembly when the light assembly is positioned in the interior wall of the shell without having to remove the water from the water immersion structure.

In some aspects, the lens can include a front surface and a flange extending rearward from the front surface of the lens. The flange can extend through an opening in the bezel. With respect to the housing, it can include a front surface and a flange extending rearward from the front surface of the housing. In some cases, the front surface of the housing can be positioned radially inward of the flange of the lens. The lens can include a patterned design for example as shown in the drawings herein.

DETAILED DESCRIPTION

Figure 1:
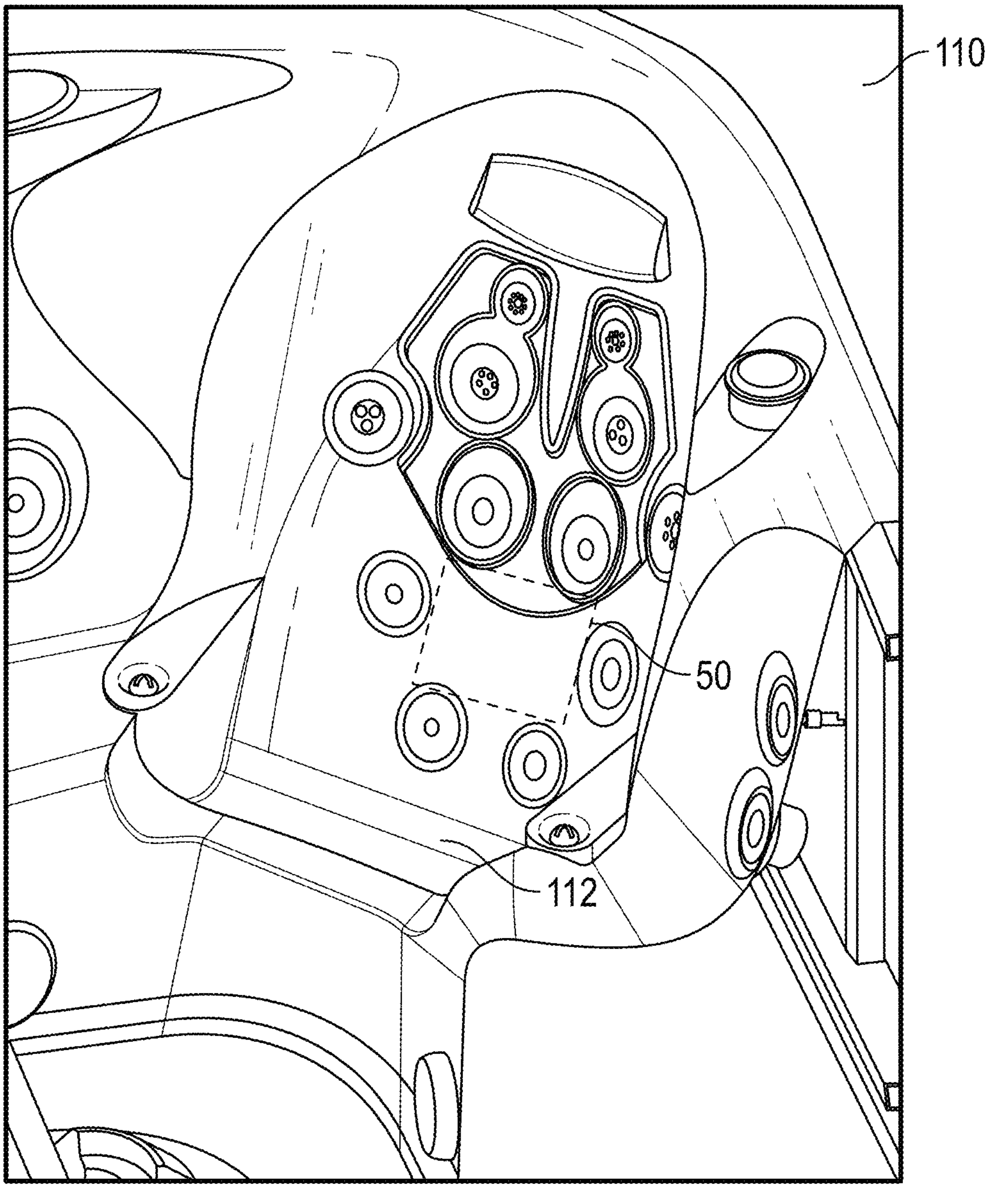
FIG. 1 illustrates a potential location for a therapeutic light assembly for a spa shell.

FIG. 1 illustrates a potential location 50 for a therapeutic light assembly to be integrated into a spa shell 110. In some cases, an interior wall the shell can define a receptacle sized and shaped to hold water. The therapeutic light assembly can be a system for water immersion. The therapeutic light assembly can be positioned below the water line under normal use conditions. In some cases, the therapeutic light assembly can be positioned on a seat back portion of the spa shell 110, between the spa seat 112 of the water line. The spa shell 110 can include a therapeutic light assembly for each spa seat or on each seating area of the spa shell 110. This can beneficially provide light therapy for one or more spa users at a time.

Figure 2:
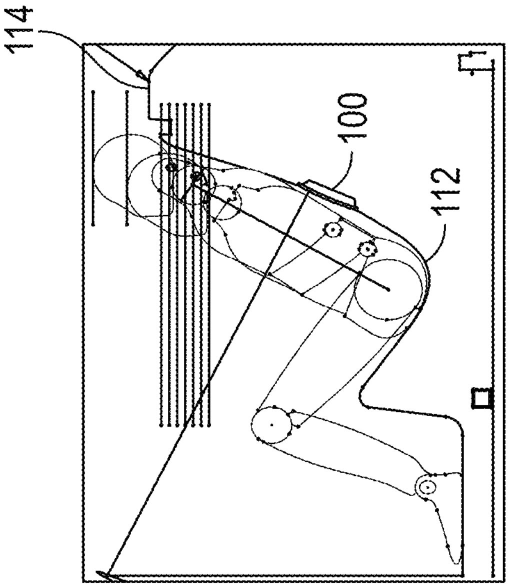
FIG. 2 illustrates a therapeutic light assembly on a lower back area of a spa seat.

As shown in FIG. 2, the therapeutic light assembly 100 can be positioned to target a lower back area of a user sitting in the spa. For example, the therapeutic light assembly 100 can be positioned closer to a spa seat 112 than an upper edge 114 of the spa. But in other configurations, the therapeutic light assembly 100 can be positioned to target the upper back area of a user sitting in the spa. In this configuration, the therapeutic light assembly 100 can be positioned closer to the upper edge 114 of the spa than the spa seat 112. The therapeutic light assembly 100 can be positioned in the spa seat 112 to target the gluteal muscles. The therapeutic light assembly 100 can be positioned between the spa seat 112 and the floor 116 of the spa to target the legs. The therapeutic light assembly can be positioned in the floor 116 of the spa to target the feet. In some cases, however, the therapeutic light assembly 100 can be positioned in more than one location on the spa shell 110 to permit light therapy on more than one part of a user's body at the same time (e.g., lower back, upper back, glutes, legs, etc.).

Figure 3:
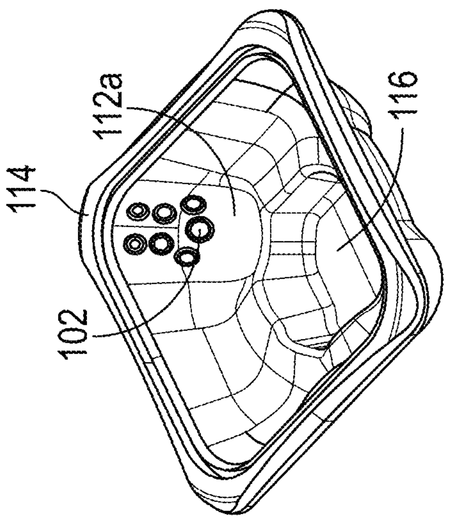
FIG. 3 illustrates a single light assembly in an interior wall of a spa unit.
Figure 4:
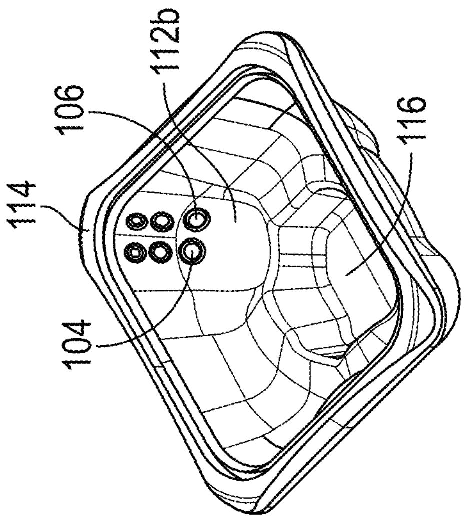
FIG. 4 illustrates two light assemblies in a seating area of a spa unit.

FIGS. 3 and 4 illustrate potential locations for a therapeutic light assembly. One or more light assemblies can be positioned between the spa seats 112*a*, 112*b* and the upper edge 114 of the spa. Although the light assemblies are illustrated in the corner of the spa, the light assemblies can be located anywhere along an interior wall of the spa where a user may rest their back. Additional light assemblies may be provided for one or more additional seating locations within the spa.

FIG. 3 illustrates a spa seat 112*a* including one light assembly 102 provided in an interior wall of the spa. The light assembly 102 is centrally located along a back portion of the spa seat 112*a* to target the middle of the user's lower back. FIG. 4 illustrates a spa seat 112*b* including two light assemblies 104, 106 in a back portion of the spa seat 112*b*. In use, both light assemblies 104, 106 target the lower back area of the user. Additional therapeutic light assemblies may be positioned in the lower back area or elsewhere in the spa shell.

Figure 5B:
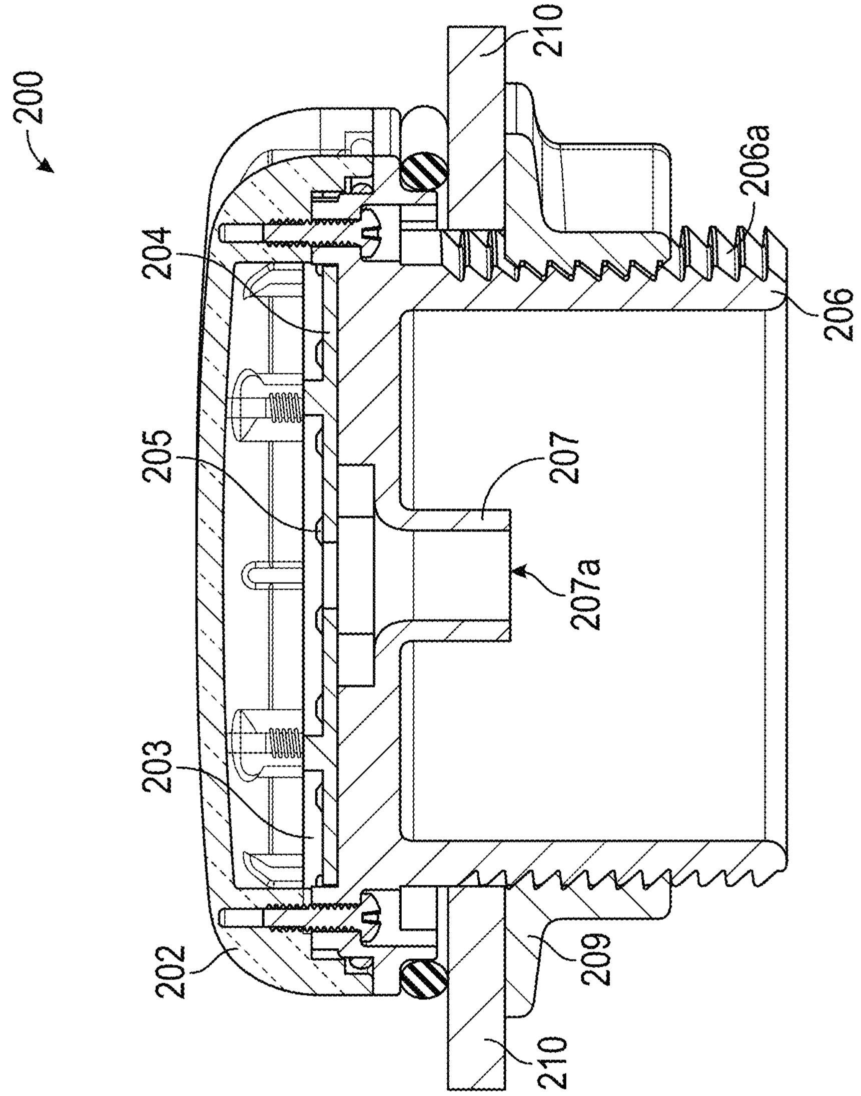
FIG. 5B illustrates a cross-section of the therapeutic light assembly shown in FIG. 5A.
Figure 5A:
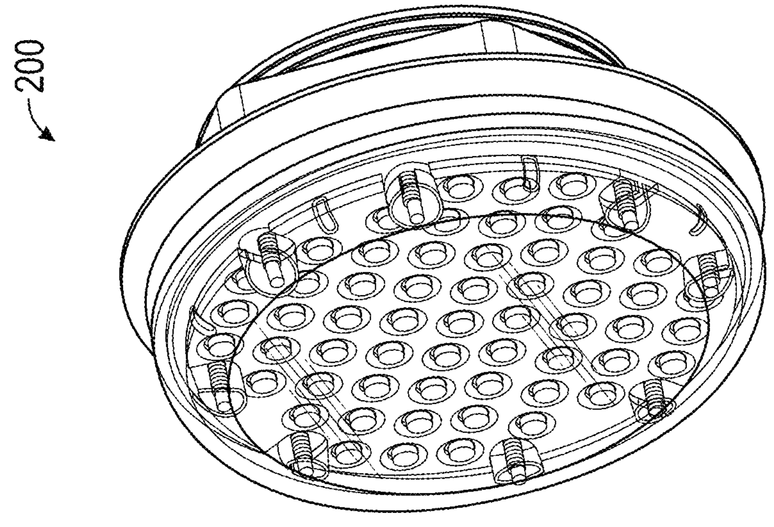
FIG. 5A illustrates an embodiment of a therapeutic light assembly.
Figure 5C:
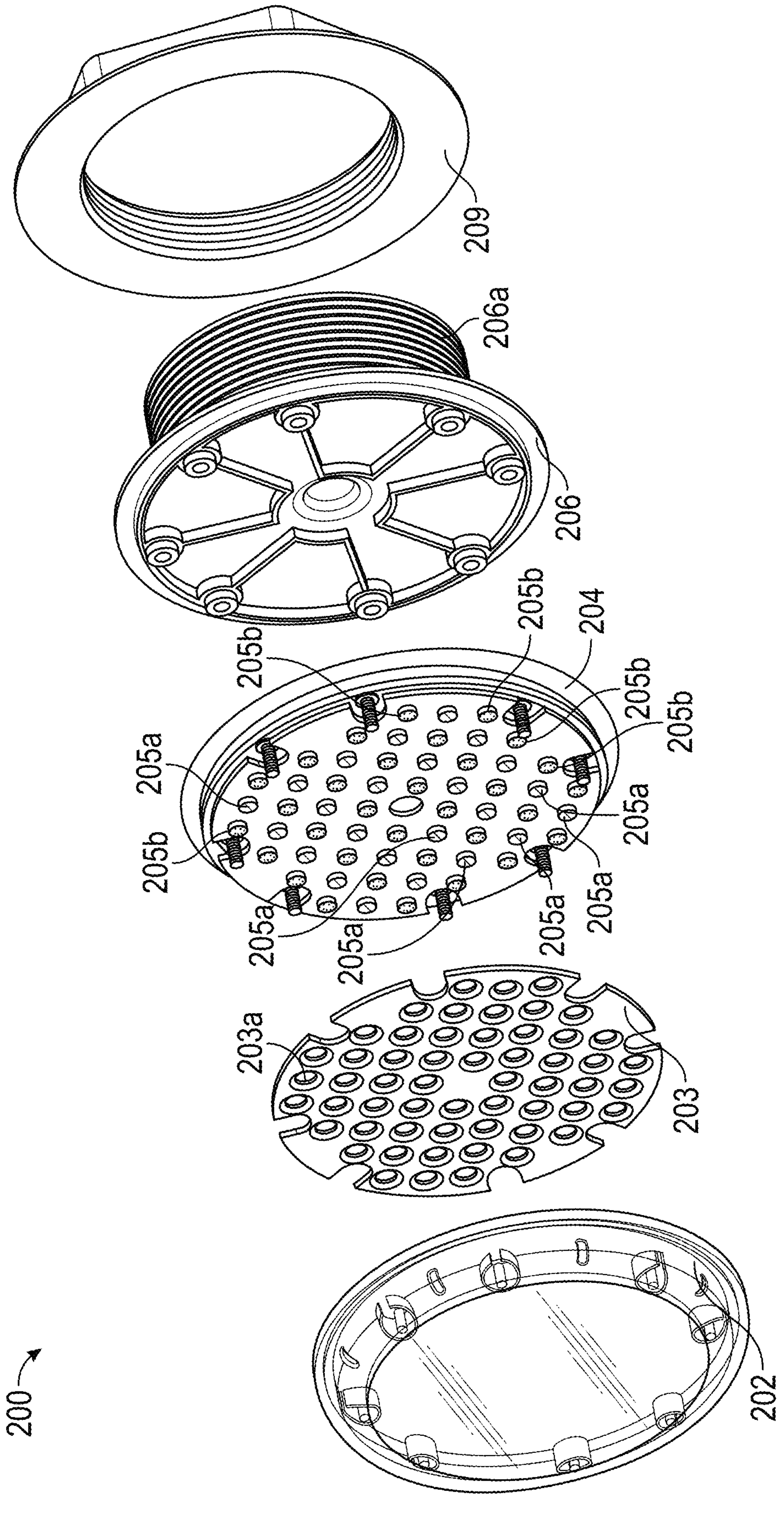
FIG. 5C illustrates an exploded view of the therapeutic light assembly shown in FIG. 5A.

FIG. 5A illustrates a therapeutic light assembly 200. FIG. 5B illustrates a cross-section of the therapeutic light assembly 200 shown in FIG. 5A. FIG. 5C shows an exploded view of the therapeutic light assembly 200 shown in FIG. 5A.

The therapeutic light assembly 200 can include a lens 202 configured to be sealed against a spa shell 210. The lens 202 can be made of a clear material that allows transmission of infrared (IR) and red light. The lens 202 can be fabricated out of a light diffusing material or layered by a light diffusing film. To avoid discomfort, the lens 202 can be shaped to conform to an inner surface of the spa shell 210. For example, the light assembly 200 can be recessed within the lens assembly so that the lens 202 is flush with the inner surface of the spa shell or only slightly protrudes from the inner surface of the spa shell.

The light assembly can include a housing 206 recessed in the spa shell. A plurality of LEDs can be positioned between the lens and the housing. The plurality of LEDs can include a plurality of visible and/or IR LEDs. The plurality of LEDs can be mounted to a board, for example a PCB 204. For example, as shown in FIG. 5C, the plurality of LEDs 205 can include a plurality of red-light LEDs 205*a* (e.g., 660 nm) and a plurality of IR LEDs 205*b* (e.g., near-IR at 850 nm). Red-light LEDs 205*a* can include light having a wavelength ranging between about 400 nm to about 700 nm. IR LEDs 205*b* can include light having a wavelength ranging between about 700 nm to about 1 mm. The visible and IR LEDs 205*a*, 205*b* can be positioned to create overlapping cones of light, so the light interferes with each other. For example, the visible and IR LEDs 205*a*, 205*b* can be positioned in alternating order. In this configuration, a visible LED and an adjacent IR LED can have overlapping cones of light. The plurality of LEDs 205 can also be positioned to provide a substantially uniform field of light and/or to create a uniform intensity over a treatment area for both red and IR light. The plurality of LEDs can include the same number of red-light LEDs 205*a* and IR LEDs 205*b* or different numbers of LEDs. For example, the light assembly can include more red-light LEDs 205*a* than IR LEDs 205*b*.

The visible and IR LEDs 205*a*, 205*b* can be independently operated based, for example, on the desired therapeutic treatment. Possible specifications for the LEDs are provided below in Table 1. The combination of red LEDs 205*a* and IR LEDs 205*b* can beneficially provide enhanced light therapy. Red light can provide more effective light therapy to the surface of the skin while the wavelength of the IR light can penetrate more deeply into the body. The light assembly can include the same number of red LEDs 205*a* and IR LEDS 205*b* or a different number of red LEDs 205*a* and IR LEDs 205*b*. For example, the light assembly 200 can include a greater number of red LEDs 205*a* than IR LEDs 205*b*, for example 20 red LEDs 205*a* and 18 IR LEDs 205*b*.

TABLE 1

LED Specifications

| LED Specifications | Wavelength | # of LEDs | View Angle | Radiant Flux | Max Power Input (W) |
|---|---|---|---|---|---|
| IR Sources | 850 nm-1 mm | 18 to 32 LEDs | 120-130 | 200-950 | 3.5 (per LED) |
| Red Sources | 400 nm-700 nm | 18 to 32 LEDs | 120-130 | 150-300 | .84 (per 2 LEDs) |

The light assembly 200 can include a cover plate 203 between the lens 202 and the plurality of LEDs 205. The cover plate 203 can have a pattern of holes 203*a* to match the pattern of the plurality of LEDs 205. Optionally, a light diffuser (not shown) can be positioned between the plurality of LEDs 205 and the lens 202.

The lens 202 can be secured and sealed to the housing 206 that encapsulates the cover plate 203, the plurality of LEDs 205, and other electronics. The housing 206 can include a sealed jacketed wire harness that exits through the rear (side opposite to the lens) and on outer side of the spa shell. For example, the sealed jacketed wire harness can exit through a sealed grommet 207 of the housing 206 (see FIG. 5B). The sealed grommet 207 can include an opening 207*a* which can beneficially allow the wire harness to extend through the sealed grommet 207 and connect to the PCB 204. The geometry of the housing 206 can limit propagation of IR waves up to the water level. For example, the plurality of LEDs can be recessed in a bore in the housing 206. As shown in FIG. 5B, the plurality of LEDs 205 are entirely recessed a front edge of the housing 206. The housing 206 of the therapeutic light assembly 200 can include a threaded interface 206*a* for attachment to the spa shell 210. A nut 209 with a corresponding threaded interface can beneficially secure the housing 206 to the spa shell 210.

The light assembly 200 can include features to cool the plurality of LEDs 205 or space around the plurality of LEDs 205. For example, the light assembly 200 can include vent openings in the back of the housing 206 and PCB 204 where the plurality of LEDs 205 are mounted to allow for cooling. The light assembly 200 may additionally or alternatively include a heat sink and/or cooling fan. The heat sink can beneficially draw heat away from the light assembly 200 and into a space behind the shell 210.

In some cases, the frequency at which the plurality of LEDs 205 is activated, the time the plurality of LEDs 205 are active, and the number of plurality of LEDs 205 activated at the same time can be controlled. This can beneficially regulate the temperature of the light assembly 200 and its surroundings. For example, reducing the number of active IR LEDs 205*b* can reduce the amount of heat generated by the light assembly 200 and thus reduce (or cool) the temperature of the light assembly 200 and its surroundings. In some cases, the electric current powering the light assembly 200 can be decreased to reduce the amount of heat generated by the light assembly 200. Reducing the electric current, for example, can reduce the amount of heat generated by the plurality of LEDs 205. The light assembly 200 can also include a constant current control which can beneficially reduce the amount of heat waste generated by the light assembly 200.

The user can select from one or more pre-programmed therapy modes or customize treatment. One example of a pre-programmed therapy mode can include activating the light therapy system for about 20 minutes. The amount of time the light therapy system is activated can be decreased or increased. In some cases, for example, a pre-programmed therapy mode can include activating the light therapy system for more than or less than 20 minutes (e.g., 2, 5, 10, 12, 15, 18, 22, 25, 30 minutes, etc.).

Figure 6:
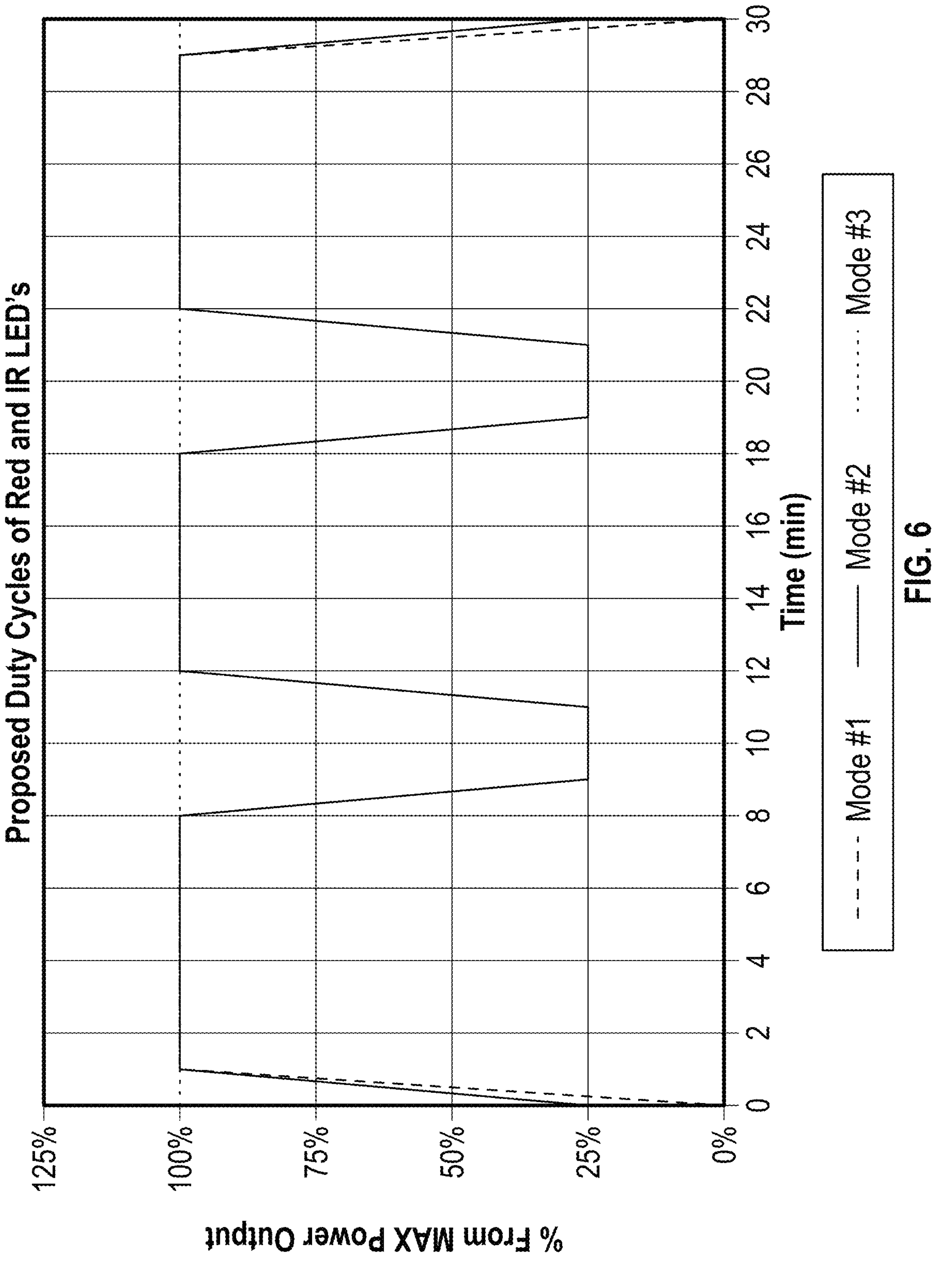
FIG. 6 illustrates possible therapy cycles of red and IR LEDs for three different modes.

The different therapy modes can vary LED intensity, the number of activated LEDs, and/or the duration of the therapy cycle. In the case of customized treatments, the system may place limits on different variables, for example safe times, intensities and resultant delivered total fluence. Therapeutic variables are outlined below in Table 2. Possible duty cycles of red and IR LEDs are shown for three different modes in FIG. 6.

TABLE 2

System Specifications

| System Specifications | Metric |
|---|---|
| System Voltage | 10 VDC-15 VDC |
| Power (Maximum) | IR Light: 3.5 Watts per IR LED (2 IR LEDs minimum) Red Light: 0.84 Watts per 2 red light LEDs |
| Current Draw (Maximum) | 600 mA–/Light + (104 mA per LED, 6 banks of LEDs) |
| IR Irradiance (Max @ 0 inches) | 30 to 150 mW/cm2 |
| Red Irradiance (Max @ 0 inches) | 5 to 90 mW/cm2 |
| Range of IR Intensity Adjustment | 0-100% |
| Range of Red Intensity Adjustment | 0-100% |
| Time of Therapy | 0-30 Minutes |
| Preset Therapies | Yes |

The therapy modes can be selected or controlled through a user interface on or near the spa. The therapy modes may also be controlled using a remote device, for example on an application configured to run on the remote device. A software module or application (app) can be installed on a remote device, the software module or application can include a non-transitory, computer-readable media that can store computer-executable instructions. When executed by the software module or application, the computer-executable instructions can cause the software module or application to receive a user input and communicate the instructions to the spa to adjust an intensity and/or duration of light emitted from the at least one infrared LED of the light assembly. In some cases, the computer-executable instructions can cause the processor to maintain the plurality of infrared LEDs and the plurality of red LEDs at a constant level of power output for an entirety of a pre-determined time period, and/or gradually increase a power output of the plurality of infrared LEDs and the plurality of red LEDs over a period. The computer-executable instructions can also cause the processor to activate only the plurality of red LEDs. This can beneficially prevent the therapeutic light assembly from overheating when, for example, the therapeutic light assembly is activated for demonstration purposes (e.g., in the absence of water thus preventing the plurality of IR LEDS from overheating).

The user interface or remote device can also provide usage reports to track therapy routines. In some cases, the remote device can wirelessly communicate with the spa unit via a cellular or a wi-fi connection. The application on the remote device can control, for example, operation of the light assembly 200 by allowing the selection of a therapy mode, starting or ending a therapy session, and/or selecting the duration of the therapy session, etc. In some cases, the application on the remote device can create and display a log of a user's light therapy sessions. The application can also create therapy recommendations based on a user's light therapy session history and/or preferences.

Operation of any of the light therapy assemblies described herein can be controlled through a controller (also referred to herein as a processor). The system can include a user interface for receiving an input regarding operation of the light therapy assembly. The controller and user interface can be onboard or remote from the spa. For example, user interface can include a light therapy dedicated menu for activating/deactivating the light therapy system, selecting one or more therapy modes, and/or setting up light therapy configurations, etc. Light therapy configurations can include, for example, controlling the number of red light versus IR lights activated on the light therapy assembly, the duration of a light therapy session, etc.

In some cases, the controller can include a memory that stores computer-executable instructions and a processor in communication with the memory. In some cases, when executed by the processor, the computer-executable instructions can cause the processor to activate the plurality of infrared LEDs and the plurality of red LEDs and/or deactivate the plurality of infrared LEDs and the plurality of red LEDs after a pre-determined period. The pre-determined period, in some cases, can be less than or equal to about 20 minutes. The pre-determined period can, however, be less than or equal to about 10, 15, 25, 30 minutes etc.

In some cases, the user interface may provide an indication about the operational status of the light therapy system. For example, the user interface can show a message indicating that a light therapy session is about to begin, that a light therapy session is currently in progress, and/or that a light therapy session is about to end. Additionally, or alternatively, the user interface can also show a timer indicating the time before a light therapy session is set to begin and/or the time remaining before a light therapy session ends.

To prevent accidental or inadvertent activation and/or operation of the light therapy system, the controller can include safe activation procedures. For example, the controller can be programed so that the light therapy system is activated and/or a light therapy system user interface is displayed only upon the completion of an activation command. An activation command can include, for example, pressing and holding a button and/or a region of the display for a predefined period (e.g., 2, 3, 4, 5, 6 seconds, etc.), pressing a sequence of buttons, and/or inputting a password into a user interface of the controller, etc. The controller can also prompt the user to confirm an on-screen message to acknowledge that the light therapy system is being activated before activation of the system.

The system may include a sensor for determining the presence of the user in a seat with the therapeutic light assemblies. The therapeutic light assembly may remain off if no user is detected in the seat. The system can also include a sensor for determining the presence of water within the spa to allow or prevent activation of the therapeutic light assemblies. For example, the controller can inhibit or prevent a therapeutic light assembly from activating if sensor determines that the spa does not have any water or the water level within the spa is below a predefined threshold (e.g., water line is below the therapeutic light assembly and/or not covering the therapeutic light assembly completely).

Figure 7A:
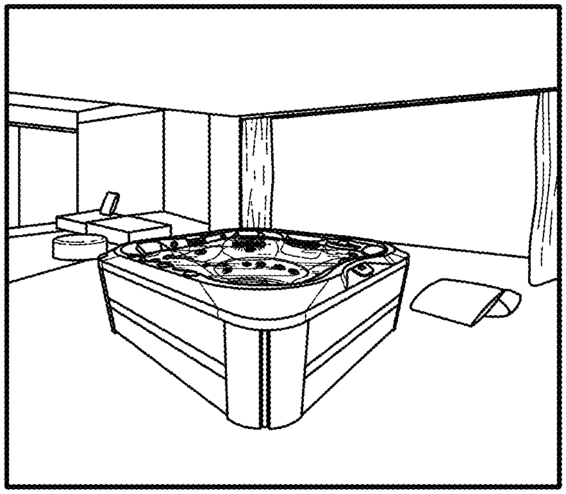
FIGS. 7A-7C illustrate a therapeutic light assembly incorporated into different settings.
Figure 7B:
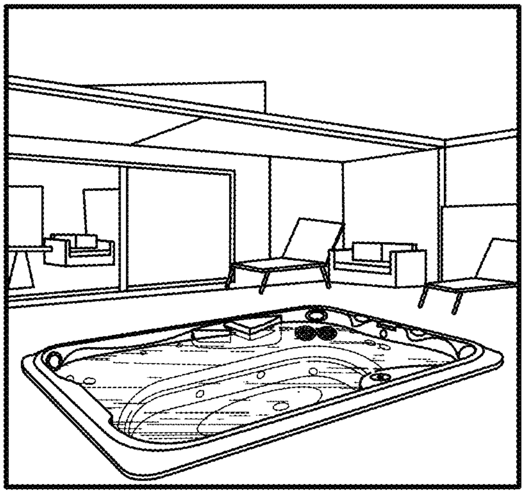
Figure 7C:
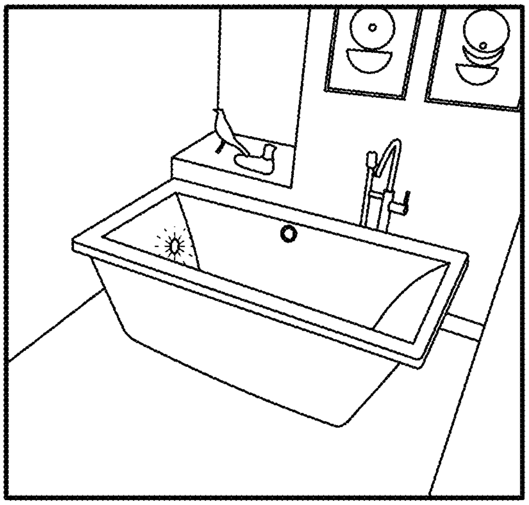

Although the present disclosure has been described with respect to spas, the light assembly described herein could be incorporated into a pool, bath, whirlpool or experience bath, shower, sauna or any other setting where light therapy may be beneficial, as shown in FIGS. 7A-7C. As shown in FIG. 7A, the therapeutic light assembly can be incorporated into a spa unit. In some cases, the therapeutic light assembly can be incorporated into a swim spa, as shown in FIG. 7B. The therapeutic light assembly can also be incorporated into a bathtub, as shown in FIG. 7C.

Depending on the application, any of the light assemblies described herein can include an individual power cord which can beneficially allow the light assembly to be connected to a standard power outlet (e.g., 120V or 240V power outlets). For example, a light assembly for a bath application can include a power cord which can be connected to a 120V power outlet. The light assemblies can also be wired into the spa unit's electronics which can be plugged in or hard wired depending on the application. In some cases, light therapy can be applied in a dry setting. For example, in a bath, shower, or sauna application, users can activate the light assembly to provide light therapy even in the absence of water.

Figure 8:
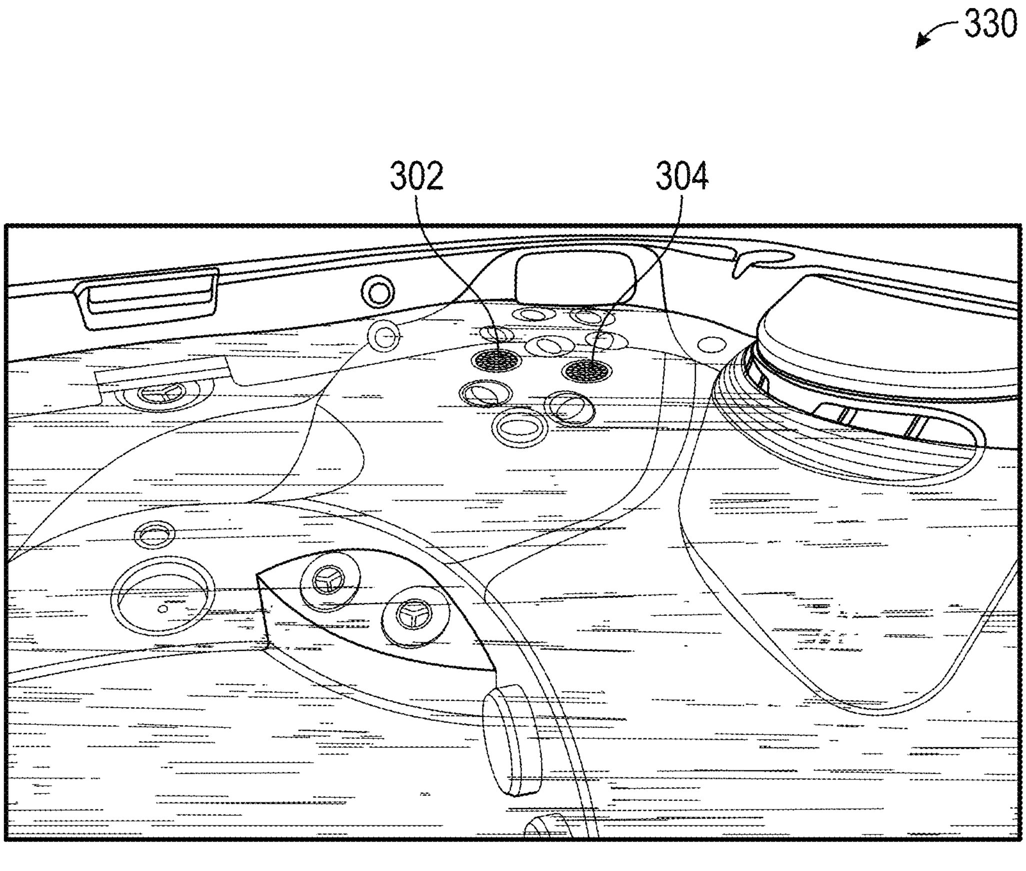
FIG. 8 illustrates a spa unit with an inactive light therapy system.
Figure 9:
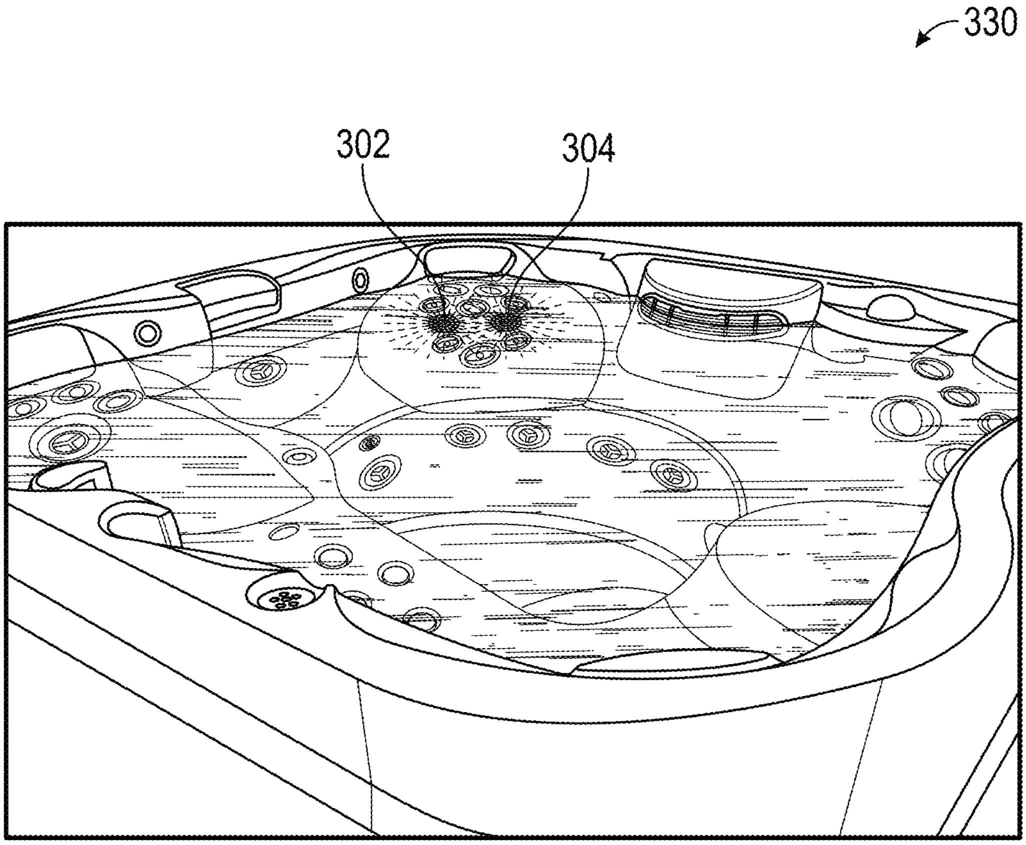
FIG. 9 illustrates a spa unit with an active light therapy system.

FIGS. 8 and 9 show a spa unit 330 with an inactive light therapy system and an active light therapy system respectively. When the light therapy system is inactive, as shown in FIG. 8, the LEDs of the therapeutic light assembly are off and therefore do not emit any IR and/or red light. When the light therapy system is active, as shown in FIG. 9, at least some of the LEDs of the therapeutic light assembly are on thereby emitting IR and/or red light. The therapy light system shown in FIGS. 8 and 9 includes two therapeutic light assemblies 302, 304. However, the light therapy system can include less than or more than two therapeutic light assemblies. Moreover, the therapeutic light assembly can be positioned on one or more corners of the spa unit, and/or along the interior walls of the spa where a user may rest their back. Beneficially, this can allow more than one user to receive infrared light therapy at the same time.

Figure 10:
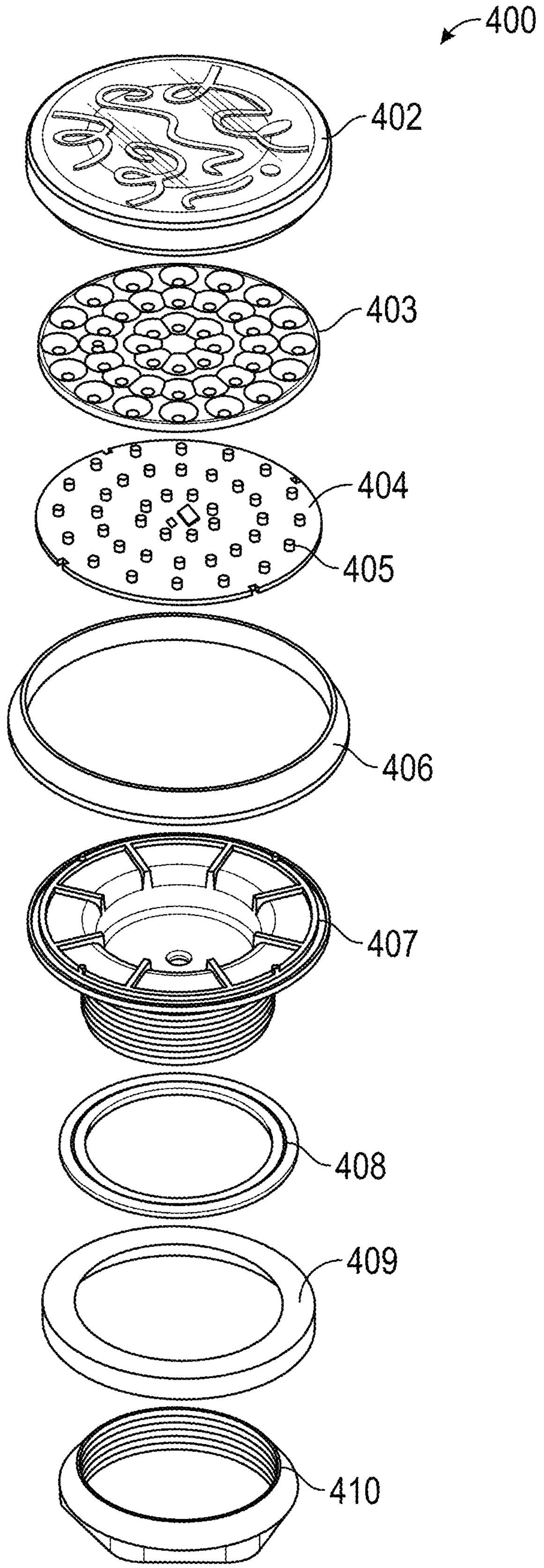
FIGS. 10, 11A, and 11B illustrate another embodiment of a therapeutic light assembly.
Figure 11A:
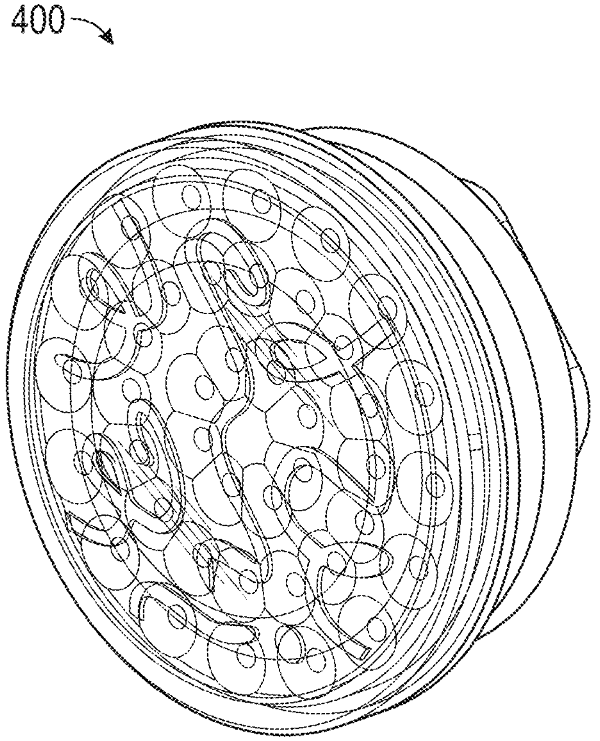
Figure 11B:
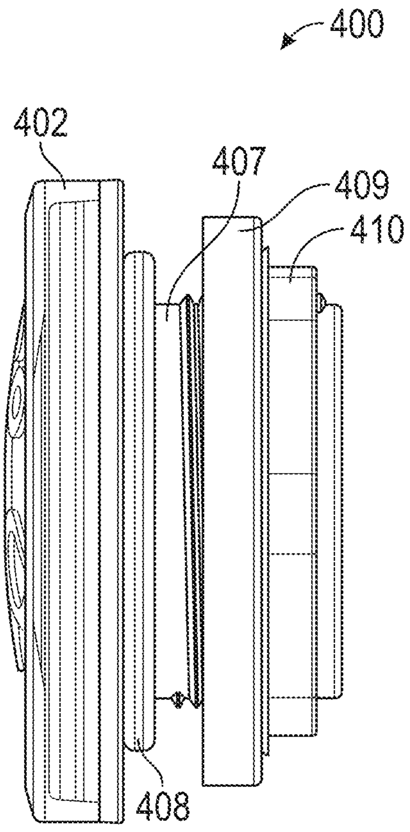

FIGS. 10, 11A and 11B show another therapeutic light assembly including a plurality of components, which can include any of the components or features described above. For example, and without limitation, the therapeutic light assembly 400 can include a lens 402, a reflector plate 403, a plurality of LEDs 405 mounted to a board, a bezel 406, and/or a housing 407, as shown in FIG. 10's exploded view of the therapeutic light assembly 400. The bezel 406 can be made of high-performance plastics (HPP). O-rings 408, washers 409, and/or nuts 410 can be used to install the therapeutic light assembly 400 to a spa unit.

Figure 12:
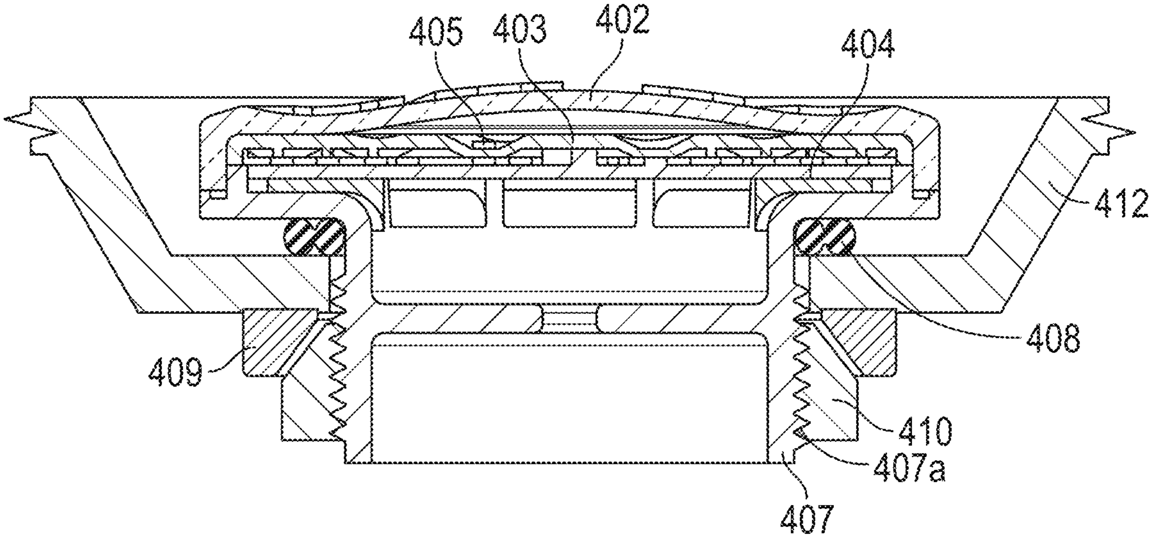
FIG. 12 illustrates a cross-section of the therapeutic light assembly shown in FIG. 10.

As previously mentioned, the lens 402 can be configured to be sealed against the spa shell 412. The lens 402 can be made of a material that allows transmission of IR and red light and/or out of light diffusing material or layered by a light diffusing film. To avoid discomfort, the lens 402 can be shaped to conform to an inner surface of the spa shell 412. For example, the lens 402 can be recessed within the lens assembly so that the lens 402 is flush with the inner surface of the spa shell 412 or only slightly protrudes from the inner surface of the spa shell 412. The housing 407 of the therapeutic light assembly 400 can be recessed in the spa shell 412. The PCB 404 containing the plurality of LEDs 405 can be positioned between the lens 402 and the housing 407. The reflector plate 403 of the light assembly 400 can be positioned between the lens 202 and the PCB 404 containing the plurality of LEDs 405. The lens 402 can be secured and sealed to the housing 407 that encapsulates the LEDs 405 and other electronics. The housing 407 can include a sealed jacketed wire harness that exits through the rear (side opposite to the lens) and on outer side of the spa shell 412. The geometry of the housing 407 can limit propagation of IR waves up to the water level. For example, the LEDs 405 can be recessed in a bore in the housing. FIG. 12 shows a cross-section of the therapeutic light assembly 400 shown in FIG. 10. As illustrated, the housing 407 of the therapeutic light assembly 400 can have a threaded interface 407*a* for attachment to the spa shell 412.

Figure 13:
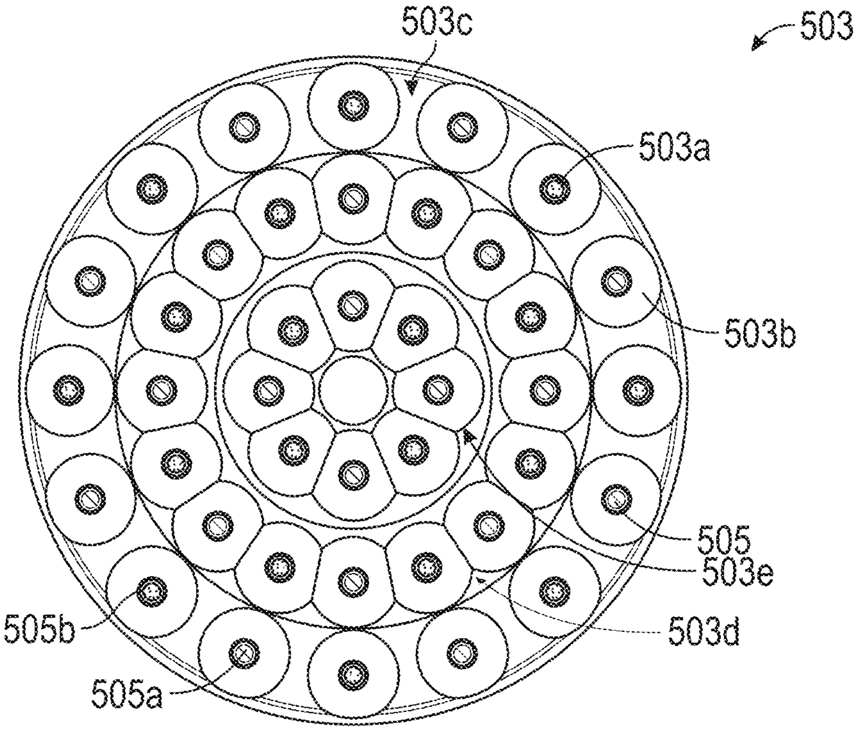
FIG. 13. Illustrates an embodiment of a reflector plate.

A reflector plate 503 is shown in FIG. 13. The reflector plate 503 can be similar to reflector plate 403, which is described in relation to FIG. 10. The reflector plate 503 can include a plurality of openings 503*a* matching the plurality of red LEDs 505*a* and IR LEDs 505*b*. The plurality of LEDs 505 can include the same number of red LEDs 505*a* and IR LEDs 505*b*, for example twenty (20) red LEDs 505*a* and twenty (20) IR LEDs 505*b*. However, other combinations are possible, including a different number of LEDs or different number of red LEDs compared to IR LEDs. In some cases, the red LEDs 505*a* can have a 660 nm wavelength output, while the IR LEDs 505*b* can have an 850 nm wavelength output. However, the red and IR LEDs 505*a*, 505*b* can have wavelength outputs less than or greater than 660 nm and 850 nm respectively. The reflector plate 503 can also include a plurality of reflecting hubs 503*b* extending from each of the plurality of openings 503*a*. Each of the plurality of reflecting hubs 503*b* and the plurality of openings 503*a* can be at least partially depressed relative to a planar surface of the reflector plane. Beneficially, the depressed configuration of the plurality of reflecting hubs 503*b* can increase the reflective surface area and improve the transmission of light emitted by the plurality of LEDs 505.

As shown in FIG. 13, the LEDs 505 can be arranged in a plurality of concentric rings, but other shapes are possible like squares, triangles, or rows. In the illustrated embodiment, there are three concentric rings, but a fewer or greater number of concentric rings is possible depending on, for example, the size of the therapeutic light assembly. As illustrated, the red LEDs 505*a* and IR LEDs 505*b* are arranged in alternating order. Each red LED 505*a* can have an adjacent IR LED 505*b* in the clockwise and counter-clockwise directions, and each IR LED 505*b* can have an adjacent red LED 505*a* in the clockwise and counter-clockwise directions. But other alternating arrangements are possible. For example, there can alternating sets of red LEDs 505*a* and sets of IR LEDs 505*b*, with each set having two LEDs, three LEDs, or more. The red LEDs 505*a* and IR LEDs 505*b* can also be positioned in an alternating arrangement in the radial direction.

Each of the plurality of reflecting hubs 503*b* can be generally annular in shape. Within each ring, the reflecting hubs 503*b* can be distinct and spaced apart as shown in the outer ring 503*c*, or the reflecting hubs 503*b* can share adjacent edges as shown in the intermediate and inner rings 503*d*, 503*e*. The reflecting hubs 503*b* in the outer ring 503*c* can have increased surface area compared to reflecting hubs 503*b* in the intermediate or inner rings 503*d*, 503*e*. The reflecting hubs 503*b* in the intermediate ring 503*d* can have increased surface area compared to the reflecting hubs in the inner ring 503*e*.

Figure 14:
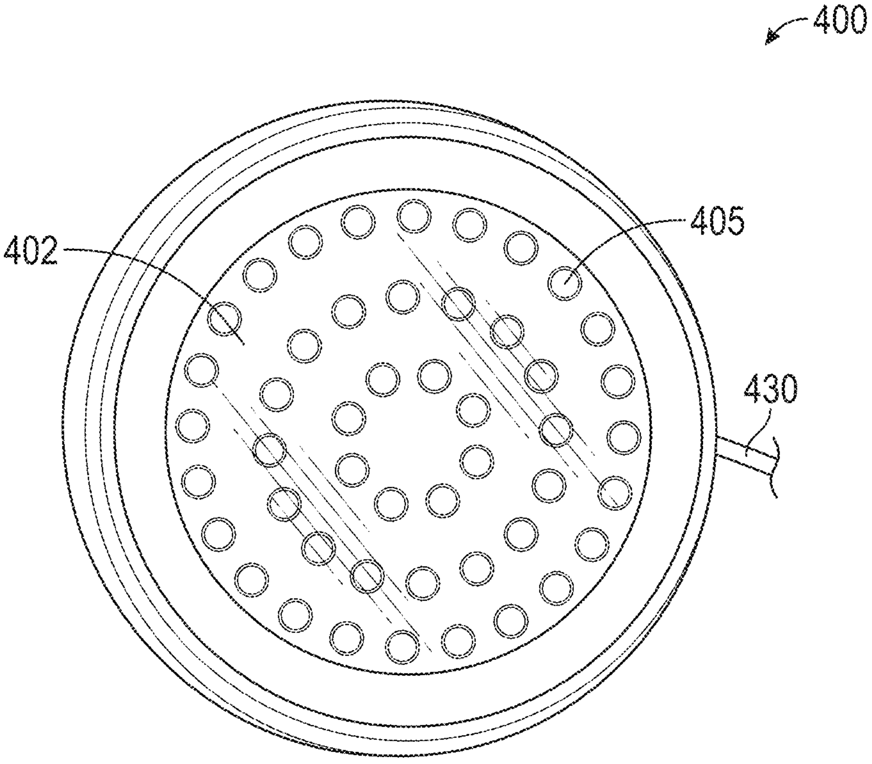
FIG. 14 illustrates yet another embodiment of a therapeutic light assembly.

FIG. 14 shows the therapeutic light assembly 400 shown in FIGS. 10-13 including a sealed jacketed wire harness 430 that can exit through the rear and an outer side of the spa shell. The sealed jacketed wire harness 430 can include a connector configured to distribute power to the therapeutic light assembly 400.

Figure 15:
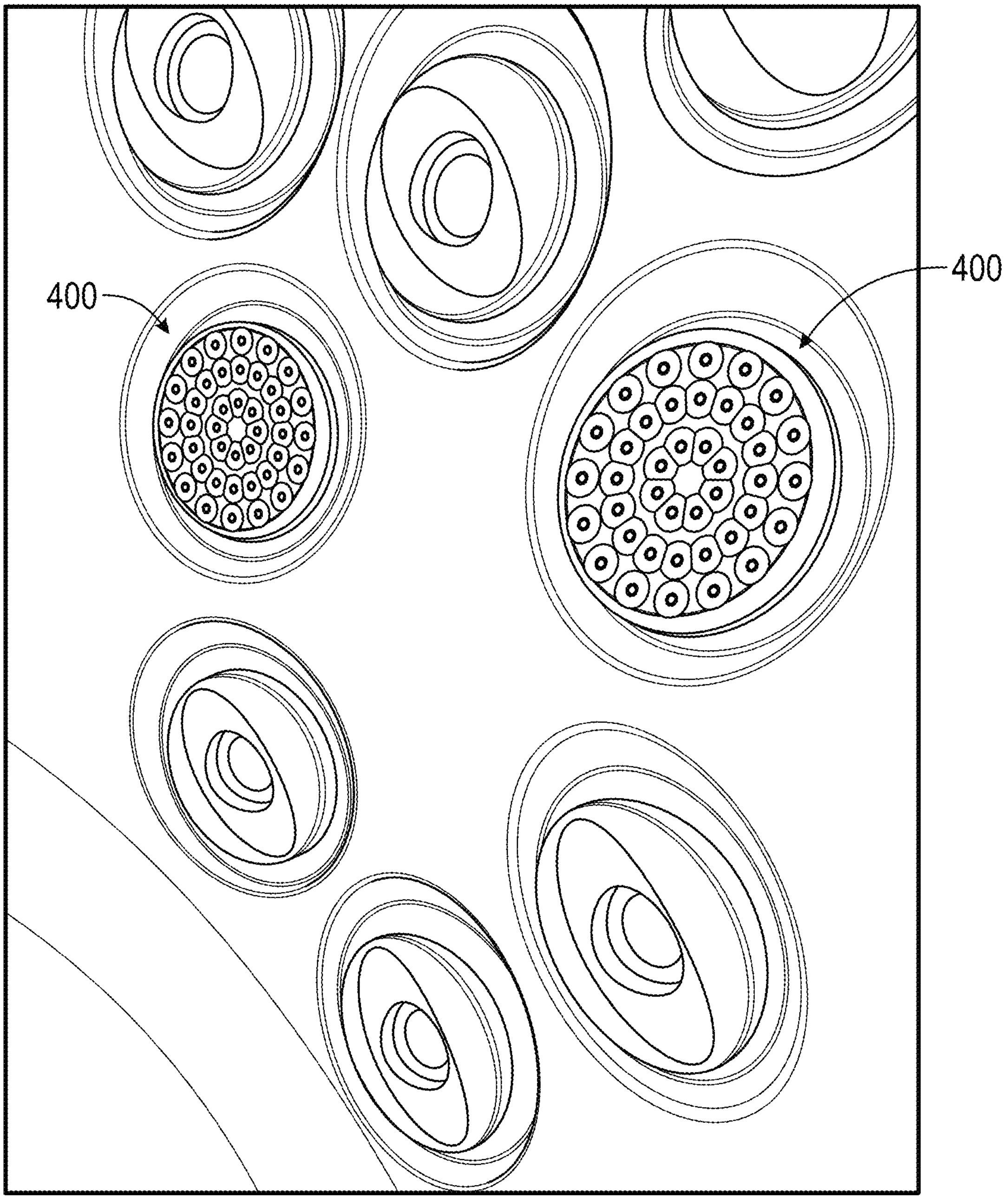
FIG. 15 illustrates an embodiment of a therapeutic light assembly including dimensions corresponding to one or more recesses of a spa unit.

A shown in FIG. 15, the therapeutic light assembly 400 can have dimensions corresponding to one or more recesses of a spa unit thereby allowing users to install one or more therapeutic light assemblies 400 to an existing spa unit. In some cases, however, the therapeutic light assembly 400 can be pre-installed to a spa unit. A diameter of the lens of the therapeutic light assembly can be less than or equal to about 5 inches, or less than or equal to about 4 inches, for example about 3.25 inches.

The therapeutic light assembly 400 can be inserted into a recess in the spa shell. The dimensions of the therapeutic light assembly 400 can be similar to the dimensions of conventional spa light assemblies or spa jets. Beneficially, this can allow spa users to replace conventional light assemblies or spa jets with therapeutic light assemblies 400 with case. For example, and as shown in FIG. 15, the therapeutic light assembly 400 can have dimensions corresponding to one or more recesses of a spa unit thereby allowing users to install one or more therapeutic light assemblies 400 to an existing spa unit. In some cases, however, the therapeutic light assembly can be pre-installed to a spa unit. In some cases, all spa jets on a spa unit can be replaced with light assemblies 400. A diameter of the lens of the therapeutic light assembly 400 can be less than or equal to about 5 inches, or less than or equal to about 4 inches, for example about 3.25 inches.

The therapeutic light assembly 400 can include features to cool the LEDs or space around the LEDs, for example one or more vent openings to ventilate the light assembly and the electronic components included therein. The therapeutic light assemblies 400 can additionally or alternatively include a heat sink and/or a cooling fan. Venting the therapeutic light assembly beneficially regulates a temperature of the light assembly thereby preventing overheating and ensuring optimal operational efficiency.

As described above, the user can select from one or more pre-programmed therapy modes or customize treatment. The therapy modes can be selected or controlled through a user interface on or near the light assembly. The therapy modes may also be controlled using a remote device, for example on an application configured to run on the remote device. The user interface or remote device can also provide usage reports to track therapy routines.

To reduce the risk of infrared light being emitted directly to a user's eyes, the spa can include an alarm system configured to produce alerts prior to and/or during a therapy session. For example, the alarm system can be configured to provide an indication that the therapy session is about to start and/or the time remaining before the therapy session starts and/or ends. The indication of the alarm system can comprise an audible alarm, a visual alarm, or a combination thereof. The activation safety features of the light therapy system (e.g., prompting users to confirm an on-screen message to acknowledge that the light therapy system is being activated) can also reduce the risk of injury to the users.

Figure 16A:
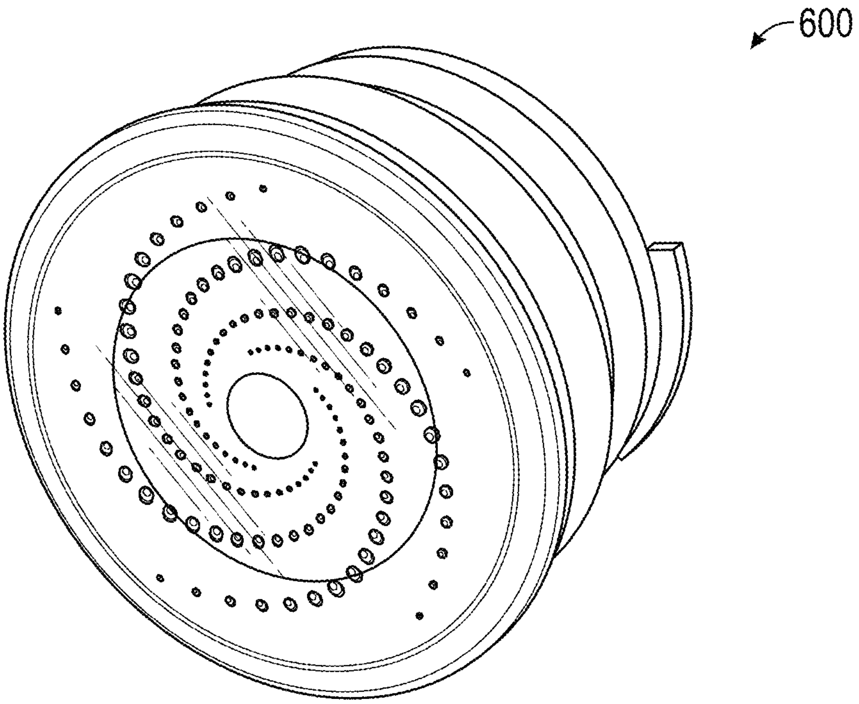
FIGS. 16A-16E illustrate another embodiment of a therapeutic light assembly.
Figure 16B:
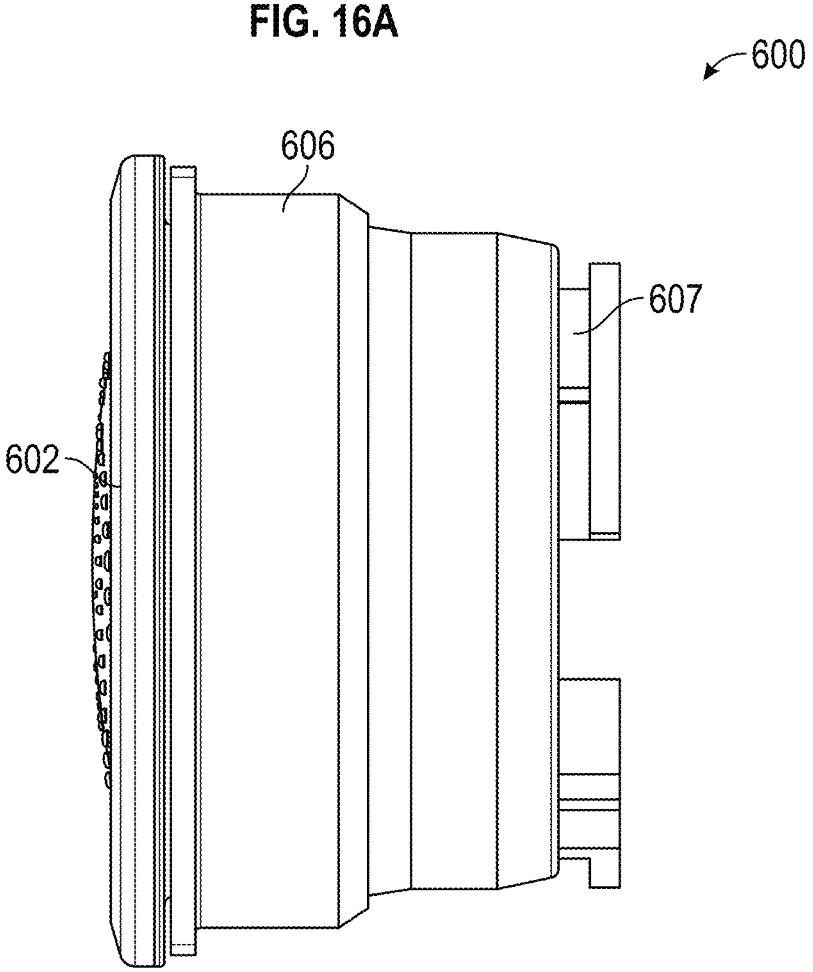
Figure 16C:
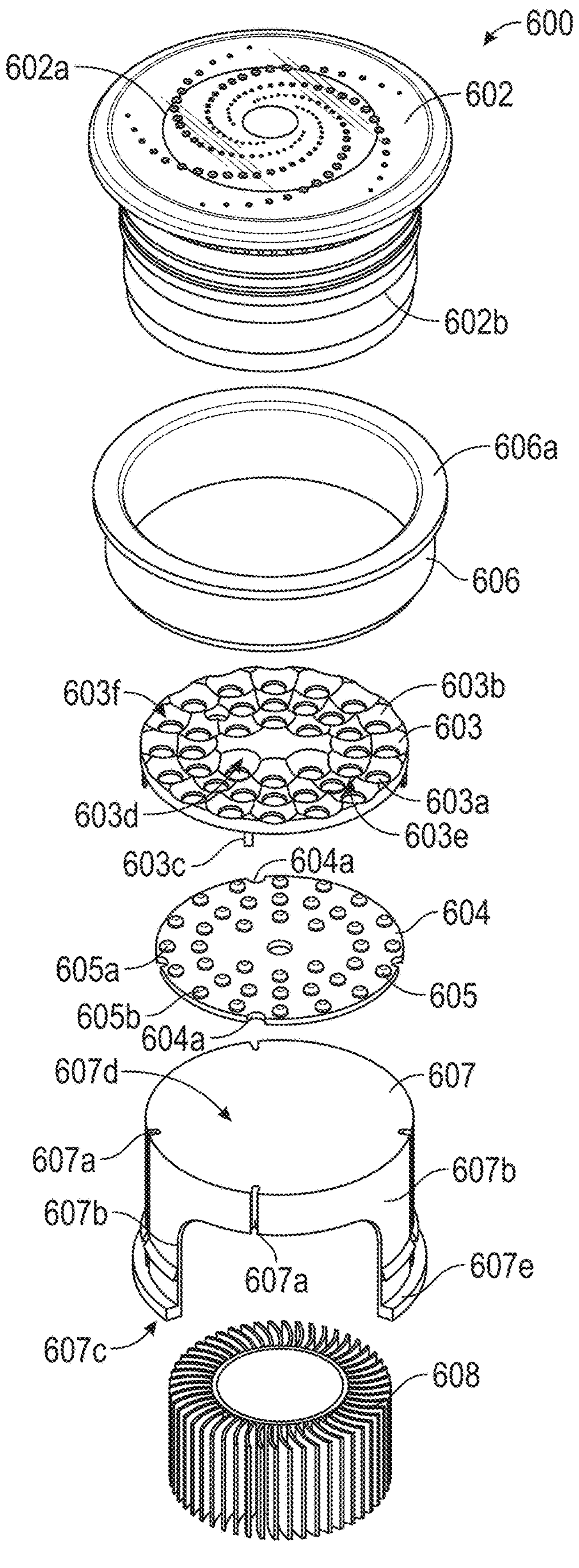

FIGS. 16A-16E show another therapeutic light assembly 600 including a plurality of components, which can include any of the components or features described above. For example, and without limitation, the therapeutic light assembly 600 can include a lens 602, a reflector plate 603, a plurality of LEDs 605 mounted to a board, a bezel 606, a housing 607, and/or a heat sink 608 as shown in FIG. 16C's exploded view of the therapeutic light assembly 600. The bezel 606 can be made of high-performance plastics (HPP).

As previously mentioned, the lens 602 can be configured to be sealed against the spa shell. The lens 602 can be made of a material that allows transmission of IR and red light and/or out of light diffusing material or layered by a light diffusing film. To avoid discomfort, the lens 602 can be shaped to conform to an inner surface of the spa shell. For example, the lens 602 can be recessed within the lens assembly so that the lens 602 is flush with the inner surface of the spa shell or only slightly protrudes from the inner surface of the spa shell. Unlike the above-described lenses, the lens 602 can include a front surface 602*a* including a pattern and a rearward extending flange 602*b*. In some cases, a front end of the lens 602 can exposed to the interior of a shell (e.g., a spa shell).

As best shown in FIG. 16C, the front surface 602*a* can include a diameter larger than an inner diameter of the flange 602*b*. In some cases, a diameter of an edge 607*e* on rear end 607*c* of the housing 607 can be greater than the inner diameter of the flange 602*b*. The reflector plate 603 and the PCB 604 can include diameters smaller than the inner diameter of the flange 602*b*. This can beneficially allow the reflector plate 603 and the PCB 604 to fit within the aperture formed by the flange 602*b* and be positioned beneath the lens 602. A diameter of a front end 607*d* of the housing 607 can also be smaller than the inner diameter of the flange 602*b* to allow the housing 607 to fit within the aperture formed by the flange 602*b*. The edge 607*e* can beneficially interact with the flange 602*b* when the housing 607 is inserted through the opening of the flange 602*b*. For example, the diameter of the edge 607*e* being larger than the diameter of the flange 602*b* can prevent the housing 607 from advancing further into the lens 602 when the edge 607*e* bumps into the flange 602*b*.

The housing 607 of the therapeutic light assembly 600 can be recessed in the spa shell. The PCB 604 containing the plurality of LEDs 605 can be positioned between the lens 602 and the housing 607. The reflector plate 603 of the light assembly 600 can be positioned between the lens 602 and the PCB 604 containing the plurality of LEDs 605. In some cases, the lens 602 can be secured and sealed to the housing 607 that encapsulates the LEDs 605 and other electronics. For example, the lens 602 can be removably secured to the housing 607, for example through a snap-fit, friction fit, threaded interface, or otherwise. The housing 607 can include one or more rearward extending flanges 607*b* for interfacing with the rearward extending flange 602*b* of the lens 602. The housing 607 can include a sealed jacketed wire harness that exits through the rear (side opposite to the lens) and on outer side of the spa shell. The geometry of the housing 607 can limit propagation of IR waves up to the water level. For example, the LEDs 605 can be recessed in a bore in the housing. FIG. 16E shows a cross-section of the therapeutic light assembly 600 shown in FIGS. 16A-16C.

The light assembly 600 can beneficially be sealed to an exterior portion of a spa unit. For example, the bezel 606 can be secured to a recess of a spa shell. For example, the bezel 606 can be secured with a mechanical connection, adhesive, glassed-in, or otherwise. When finally assembled, the lens 602 can be secured to the bezel 606 and sealed around an edge 606*a* of the bezel 606, for example using a mechanical connection or adhesive. As shown in FIG. 16E, rearward extending flange 602*b* of the lens 602 can be inserted through an opening of the bezel 606. The rearward extending flange 602*b* can extend rearward of the bezel 606 when assembled. The seal can beneficially prevent liquids, such as water, from reaching the interior components of the light assembly 600.

The remaining components of the therapeutic light assembly 600, including the reflector plate 603, the printed circuit board 604 (PCB) with red LEDs and/or IR LEDs 605, and/or the housing 607 can be mounted from an interior portion of the spa shell behind the lens 602. Each of these components may be positioned within the footprint of the lens 602, for example radially inward of the rearward extending flange 602*b* of the lens 602. Each of these components can be accessed from a rear side the therapeutic light assembly 600. For example, the exterior panels of the spa unit can be removed to access the interior portion of the spa shell and secure the reflector plate 603, the printed circuit board 604 (PCB) with red LEDs and/or IR LEDs 605, and/or the housing 607 to the lens 602 and the bezel 606 without removing the lens 602 and/or the bezel 606. This can beneficially allow users to replace at least some of the light assembly 600 components without the need to drain the water inside the spa unit.

The reflector plate 603 can include a plurality of openings 603*a* matching the plurality of red LEDs 605*a* and IR LEDs 605*b*. The plurality of LEDs 605 can include the same number of red LEDs 605*a* and IR LEDs 605*b*, for example twenty (20) red LEDs 605*a* and twenty (20) IR LEDs 605*b*. However, other combinations are possible, including a different number of LEDs or different number of red LEDs compared to IR LEDs. In some cases, the red LEDs 605*a* can have a 660 nm wavelength output, while the IR LEDs 605*b* can have an 850 nm wavelength output. However, the red and IR LEDs 605*a*, 605*b* can have wavelength outputs less than or greater than 660 nm and 850 nm respectively.

The reflector plate 603 can also include a plurality of reflecting hubs 603*b* extending from each of the plurality of openings 603*a*. Each of the plurality of reflecting hubs 603*b* and the plurality of openings 603*a* can be at least partially depressed relative to a planar surface of the reflector plate 603. Beneficially, the depressed configuration of the plurality of reflecting hubs 603*b* can increase the reflective surface area and improve the transmission of light emitted by the plurality of LEDs 605. In some cases, the plurality of LEDs 605 do not extend beyond a planar surface of the reflector plate 603 and are instead embedded within the plurality of reflecting hubs 603*b*.

The reflector plate 603 can include alignment features. For example, the reflector plate 603 can include one or more tabs 603*c*. The one or more tabs 603*c* can extend outwardly from an edge of the reflector plate 603. In some cases, the reflector plate can include one, two, three, four, five, etc., tabs 603*c*. The housing 607 can include a plurality of recesses 607*a* which can receive the one or more tabs 603*c* and secure the reflector plate 603 to the housing 607. The PCB 604 can include one or more notches 604*a* which can receive the one or more tabs 603*c* of the reflector plate 603. The housing 607 can include one recess 607*a* for each tab 603*c* of the reflector plate 603. The PCB 604 containing the plurality of LEDs 605 can be secured between the reflector plate 603 and the housing 607 when the reflector plate 603 is secured to the housing 607.

Figure 16D:
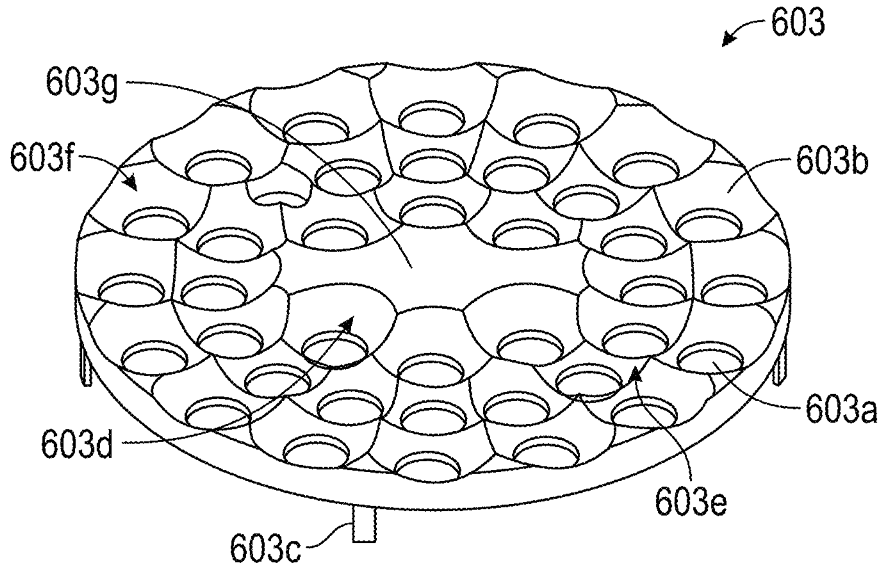
Figure 16E:
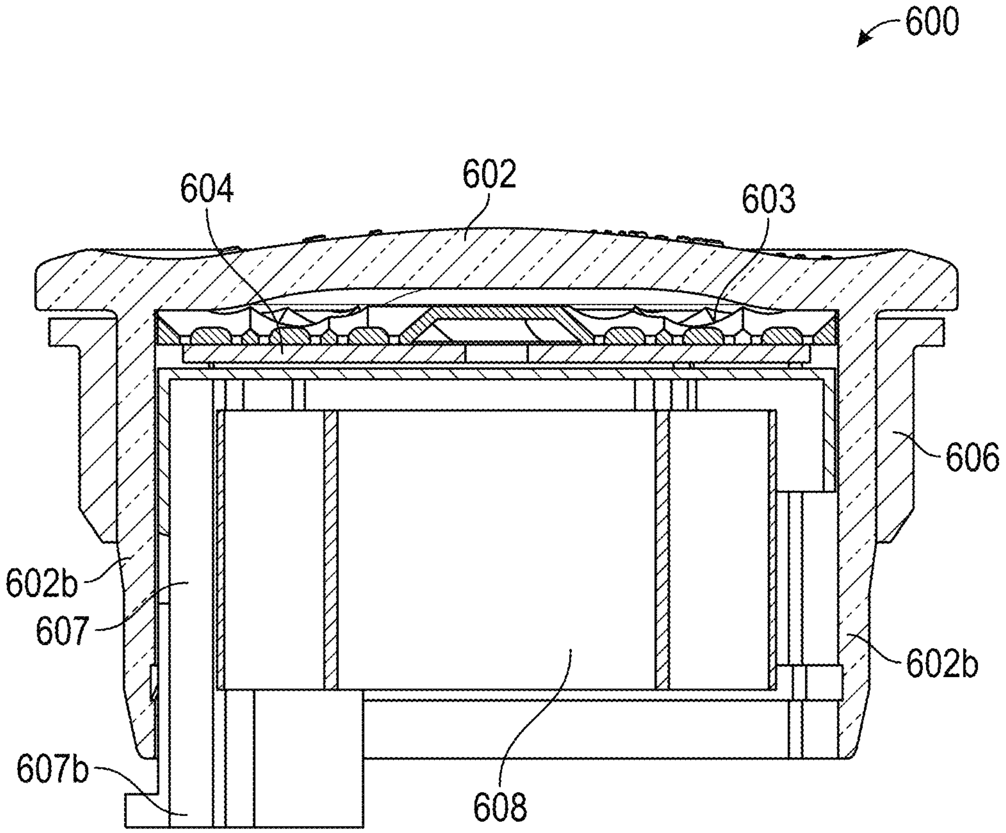

As shown in FIG. 16D, each of the plurality of reflecting hubs 603*b* can include a plurality of edges. For example, some of the reflecting hubs 603*b* can include three, four, five edges. Each of the reflecting hubs 603*b* can include less than three or more than five edges. The edges of each of the reflecting hubs 603*b* can include straight, curved, and/or semicircular edges. Within each ring of reflecting hubs 603*b*, the reflecting hubs 603*b* can share adjacent edges as shown in the inner, intermediate, and outer rings 603*d*, 603*e*, 603*f*. The reflecting hubs 603*b* in the inner ring 603*d* can have increased surface area compared to reflecting hubs 603*b* in the intermediate or outer rings 603*e*, 603*f*. The reflecting hubs 603*b* in the intermediate ring 603*e* can have a surface area smaller than the reflecting hubs in the inner and/or outer rings 603*d*, 603*f*. A central area 603*g* of the reflector plate 603 can, when positioned beneath the lens 602, contact rear facing surface of the lens 602.

The LEDs 605 can be arranged in a plurality of concentric rings, but other shapes are possible like squares, triangles, or rows. In the illustrated embodiment, there are three concentric rings, but a fewer or greater number of concentric rings is possible depending on, for example, the size of the therapeutic light assembly. As illustrated, the red LEDs 605*a* and IR LEDs 605*b* are arranged in alternating order. Each red LED 605*a* can have an adjacent IR LED 605*b* in the clockwise and counter-clockwise directions, and each IR LED 605*b* can have an adjacent red LED 605*a* in the clockwise and counter-clockwise directions. But other alternating arrangements are possible. For example, there can alternating sets of red LEDs 605*a* and sets of IR LEDs 605*b*, with each set having two LEDs, three LEDs, or more. The red LEDs 605*a* and IR LEDs 605*b* can also be positioned in an alternating arrangement in the radial direction.

Although certain embodiments and examples are disclosed herein, inventive subject matter extends beyond the examples in the specifically disclosed embodiments to other alternative embodiments and/or uses, and to modifications and equivalents thereof. While we have described and illustrated in detail embodiments of a light therapy system, it should be understood that our inventions can be modified in both arrangement and detail. Thus, the scope of the claims appended hereto is not limited by any of the particular embodiments described above. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

The features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "generally" and "substantially" as used herein represent a value, amount, or characteristic close to the stated value, amount, or characteristic that still performs a desired function or achieves a desired result. For example, the terms "generally" and "substantially" may refer to an amount that is within less than 10% of, within less than 5% of, within less than 1% of, within less than 0.1% of, and within less than 0.01% of the stated amount.

Although the light therapy system has been disclosed in the context of certain embodiments and examples, it will be understood by those skilled in the art that light therapy system and subassemblies extend beyond the specifically disclosed embodiments to other alternative embodiments and/or uses of the embodiments and certain modifications and equivalents thereof. Accordingly, it is intended that the scope of the light therapy system herein disclosed should not be limited by the particular disclosed embodiments described above but should be determined only by a fair reading of the claims that follow.

What is claimed is:

1. A spa comprising:

a shell comprising an interior wall defining a receptacle sized and shaped to hold water, the shell comprising a seat between a floor of the shell and an upper edge of the shell; and a plurality of therapeutic light assemblies, wherein each of the plurality of therapeutic light assemblies comprises a plurality of red lights and a plurality of infrared LEDs;

wherein each of the plurality of therapeutic light assemblies comprises a housing and a lens configured to allow transmission of red light and infrared light, the lens configured to be positioned within a concave recess of the shell and surrounded by a portion of the interior wall, wherein a diameter of the lens is smaller than a diameter of the concave recess of the shell;

wherein, in use, each of the plurality of therapeutic light assemblies is configured to be positioned below a water line, and wherein a first one of the plurality of therapeutic light assemblies is positioned between the seat and the upper edge of the shell such that when the first one of the plurality of therapeutic light assemblies is active, the first one of the plurality of therapeutic light assemblies is configured to direct light directly to a user.

2. The spa of claim 1, wherein each of the plurality of therapeutic light assemblies is positioned within a recess of the shell configured to receive a spa jet.

3. The spa of claim 1, wherein a second one of the plurality of therapeutic light assemblies is positioned on a lower back area of the seat.

4. The spa of claim 1, wherein the plurality of infrared LEDs have a wavelength ranging from about 700 nm to about 1 mm.

5. The spa of claim 1, wherein each of the plurality of therapeutic light assemblies comprises a plurality of red LEDs.

6. The spa of claim 1, wherein the plurality of red lights have a wavelength ranging from about 400 nm to about 700 nm.

7. A spa comprising:

a shell comprising an interior wall defining a receptacle sized and shaped to hold water, the shell further comprising a seat between a floor of the shell and an upper edge of the shell; and a plurality of therapeutic light assemblies, wherein each of the plurality of therapeutic light assemblies comprises a first plurality of lights arranged in a circular shape and a second plurality of lights surrounded by the first plurality of lights, wherein each of the first plurality of lights and the second plurality of lights comprises red LEDs and infrared LEDs;

wherein each of the plurality of therapeutic light assemblies comprises a housing at least partially recessed in the interior wall of the shell, and wherein each of the first plurality of lights and the second plurality of lights are positioned on a portion of the housing positioned in the receptacle;

wherein a first one of the plurality of therapeutic light assemblies is positioned between the seat and the upper edge of the shell;

wherein a second one of the plurality of therapeutic light assemblies is positioned between the seat and the floor of the shell; and wherein, when the first one of the plurality of therapeutic light assemblies and the second one of the plurality of therapeutic light assemblies are active, the first one of the plurality of therapeutic light assemblies and the second one of the plurality of therapeutic light assemblies are configured to direct light directly to a user; and wherein each of the plurality of therapeutic light assemblies further comprises a lens configured to allow transmission of red light and infrared light, and wherein the lens is positioned within a concave recess of the shell such that a peripheral edge of the lens is located radially inward from the interior wall defining the recess.

8. The spa of claim 7, wherein the first plurality of lights comprises red LEDs and the second plurality of lights comprises red LEDs.

9. The spa of claim 8, wherein the red LEDs have a wavelength ranging from about 400 nm to about 700 nm.

10. The spa of claim 7, wherein the first plurality of lights comprises infrared LEDs and the second plurality of lights comprises infrared LEDs.

11. The spa of claim 10, wherein the infrared LEDs have a wavelength ranging from about 700 nm to about 1 mm.

12. The spa of claim 7, wherein each of the plurality of therapeutic light assemblies is positioned within a recess of the shell configured to receive a spa jet.

13. The spa of claim 7, wherein the lens comprises a circular shape.

14. The spa of claim 7, wherein each of the plurality of therapeutic light assemblies comprises a circular shape.

15. The spa of claim 7, wherein the first one of the plurality of therapeutic light assemblies is positioned on a lower back area of the seat.

16. The spa of claim 7, wherein the first one of the plurality of therapeutic light assemblies is positioned adjacent to one or more spa jets.

17. The spa of claim 7, wherein each of the plurality of therapeutic light assemblies comprises a plate comprising:

a plurality of openings, wherein each of the openings is configured to receive one of the red LEDs or the infrared LEDs, and a plurality of hubs surrounding the plurality of openings;

wherein each of the plurality of openings and each of the plurality of hubs are depressed relative to a planar surface of the plate.

18. The spa of claim 7, further comprising a non-transitory computer readable storage medium including software configured to cause a processor to:

receive a selection of one of a plurality of pre-programmed therapy modes; and control the plurality of therapeutic light assemblies according to the selected one of the plurality of pre-programmed therapy modes.

19. The spa of claim 18, wherein each of the plurality of pre-programmed therapy modes varies an LED intensity, a number of active LEDs, and/or a therapy duration.

20. The spa of claim 7, wherein each of the plurality of therapeutic light assemblies comprises a heat sink positioned behind the housing, the heat sink configured to draw heat away from each of the plurality of therapeutic light assemblies.

21. A spa comprising:

a shell comprising an interior wall defining a receptacle sized and shaped to hold water; and a plurality of therapeutic light assemblies, wherein:

each of the plurality of therapeutic light assemblies comprises a housing at least partially recessed in the interior wall of the shell, infrared LEDs, and a lens positioned within a concave recess of the shell and surrounded by a portion of the interior wall and configured to allow transmission of infrared light, the lens having a diameter smaller than a diameter of the recess of the shell;

in use, each of the plurality of therapeutic light assemblies is configured to be positioned below a water line, when the plurality of therapeutic light assemblies are active, the plurality of therapeutic light assemblies are configured to direct infrared light directly to a user.

22. The spa of claim 21, wherein:

the shell further comprises a seat between a floor of the shell and an upper edge of the shell; and a first one of the plurality of therapeutic light assemblies is positioned between the seat and the upper edge of the shell.

* * * * *